United States Patent
Santos et al.

(10) Patent No.: US 8,557,907 B2
(45) Date of Patent: *Oct. 15, 2013

(54) REACTIVE BLOCK COPOLYMERS FOR THE PREPARATION OF INORGANIC TUBULE-POLYMER COMPOSITES

(75) Inventors: Leticia Flores Santos, Metepec (MX); Alfonso González Montiel, Atizapán de Zaragoza (MX); María Dolores Baeza Alvarado, Lerma (MX); Edgar Espinoza Rodríguez, Delegación Benito Juarez (MX)

(73) Assignee: Macro-M S.A. de C.V., Distrito Federal (MX)

( * ) Notice: Subject to any disclaimer, the term of this patent is extended or adjusted under 35 U.S.C. 154(b) by 668 days.

This patent is subject to a terminal disclaimer.

(21) Appl. No.: 12/072,173

(22) Filed: Feb. 25, 2008

(65) Prior Publication Data

US 2008/0200601 A1    Aug. 21, 2008

Related U.S. Application Data

(63) Continuation-in-part of application No. 11/711,206, filed on Feb. 26, 2007, which is a continuation-in-part of application No. 11/508,407, filed on Aug. 23, 2006.

(60) Provisional application No. 60/711,890, filed on Aug. 26, 2005.

(51) Int. Cl.
  C08J 3/18    (2006.01)
  C08K 3/34    (2006.01)
  C08L 83/02   (2006.01)

(52) U.S. Cl.
  USPC ............ 524/445; 524/449; 524/543; 524/556

(58) Field of Classification Search
  USPC ........... 524/80, 401, 419, 420, 435, 441, 442, 524/444, 445, 449, 451, 907, 908, 446; 525/242, 299
  See application file for complete search history.

(56) References Cited

U.S. PATENT DOCUMENTS

| | | | |
|---|---|---|---|
| 4,364,857 A | 12/1982 | Santilli | |
| 4,569,923 A | 2/1986 | Knudson, Jr. et al. | |
| 4,877,501 A | 10/1989 | Schnur et al. | |
| 4,911,981 A | 3/1990 | Schnur et al. | |
| 5,049,382 A | 9/1991 | Price et al. | |
| 5,206,284 A | 4/1993 | Fukui et al. | |
| 5,492,696 A | 2/1996 | Price et al. | |
| 5,651,976 A | 7/1997 | Price et al. | |
| 5,705,191 A | 1/1998 | Price et al. | |
| 5,876,812 A | 3/1999 | Frisk et al. | |
| 6,013,206 A | 1/2000 | Price et al. | |
| 6,050,509 A | 4/2000 | Clarey et al. | |
| 6,280,759 B1 | 8/2001 | Price et al. | |
| 6,384,121 B1 | 5/2002 | Barbee et al. | |
| 6,401,816 B1 | 6/2002 | Price et al. | |
| 6,451,901 B1 | 9/2002 | Maekawa et al. | |
| 6,531,547 B1 | 3/2003 | Visger et al. | |
| 6,579,927 B1 | 6/2003 | Fischer | |
| 6,632,868 B2 | 10/2003 | Qian et al. | |
| 6,767,952 B2 | 7/2004 | Dontula et al. | |
| 6,787,592 B1 | 9/2004 | Powell et al. | |
| 6,936,215 B1 | 8/2005 | Price et al. | |
| 7,034,085 B2 | 4/2006 | Mestach et al. | |
| 7,125,476 B2 | 10/2006 | Schoen et al. | |
| 7,400,490 B2 | 7/2008 | Gunderman et al. | |
| 7,425,232 B2 | 9/2008 | Wang et al. | |
| 2002/0037953 A1 | 3/2002 | Lan et al. | |
| 2004/0110884 A1* | 6/2004 | Dontula et al. | ............... 524/445 |
| 2005/0004310 A1 | 1/2005 | Hong et al. | |
| 2006/0160940 A1 | 7/2006 | Muhlebach et al. | |
| 2006/0163160 A1 | 7/2006 | Weiner et al. | |
| 2007/0106006 A1 | 5/2007 | Cooper et al. | |
| 2007/0197710 A1* | 8/2007 | Wu et al. | ....................... 524/445 |
| 2007/0219329 A1 | 9/2007 | Po et al. | |
| 2008/0194406 A1 | 8/2008 | Price et al. | |
| 2008/0249221 A1 | 10/2008 | Corkery et al. | |
| 2008/0262126 A1 | 10/2008 | Fleischer et al. | |
| 2010/0068500 A1 | 3/2010 | Nelson et al. | |

FOREIGN PATENT DOCUMENTS

WO    WO 99/47575 A1    9/1999
WO    WO 2005/056644 A2    6/2005

OTHER PUBLICATIONS

Nakagaki, S. et al "Immobilization of iron porphyrins in tubular kaolinite obtained by an intercalation/delamination procedure" Journal of Catalysis vol. 242 (2006) pp. 110-117.*

Alfonso Gonzalez Montiel et al., "Novel Block Copolymers as Compatibilizers for Nanocomposites," Society of Petroleum Engineers, International Conference on Polyolefins, vol. 1, Feb. 27, 2005, p. 160-67, Curran Associates, Inc., Red Hook, New York.

Wang et al., "Synthesis of poly(methyl methacrylate)-b-poly(N-isopropylacrylamide) (PMMA-b-PNIPAM) Amphiphilic Diblock Copolymer Brushes on Halloysite Substrate via Reverse ATRP" Reactive & Functional Polymers, Elsevier Science Publishers BV, NL, vol. 68, No. 2, Nov. 5, 2007, pp. 649-655, XP022437440.

* cited by examiner

*Primary Examiner* — Irina S Zemel
*Assistant Examiner* — Jeffrey Lenihan
(74) *Attorney, Agent, or Firm* — Stephen S. Hodgson

(57) ABSTRACT

A method for modifying an inorganic tubule, such as halloysite, cylindrite, boulangerite, or imogolite, with a functionalized block copolymer for improving compatibility with a thermoplastic or thermoset polymer matrix and a composition for the modified inorganic tubule and for the modified inorganic tubule-polymer matrix are provided. In one embodiment, the block copolymer can be added to a slurry of the inorganic tubules. The pH of the slurry can be manipulated to promote ionic bonding between the inorganic tubules and one block of the block copolymer. The other block of the block copolymer is selected for compatibility with the polymer matrix for a particular application.

53 Claims, No Drawings

REACTIVE BLOCK COPOLYMERS FOR THE PREPARATION OF INORGANIC TUBULE-POLYMER COMPOSITES

CROSS REFERENCE TO RELATED APPLICATIONS

This is a continuation in part of U.S. patent application Ser. No. 11/711,206, filed Feb. 26, 2007, which is incorporated by reference and which is a continuation in part of U.S. patent application Ser. No. 11/508,407, filed Aug. 23, 2006, which is incorporated by reference and which claims priority to U.S. Provisional Patent Application Ser. No. 60/711,890, filed Aug. 26, 2005, which is also incorporated by reference.

BACKGROUND OF THE INVENTION

1. Field of the Invention

The present invention pertains to the use of block copolymers containing a reactive monomer or monomers in two or more blocks via controlled free radical polymerization and use of the composition of matter as additives for the preparation of inorganic tubule-polymer composites.

2. Description of the Related Art

One of the parent inventions, described in U.S. patent application Ser. No. 11/711,206, provides in one aspect a polymer/clay nanocomposite material comprising an organic clay, a thermoplastic matrix, and a block copolymer as a compatibilizer, where the block copolymer has a composition that includes a first block, the first block comprising monomeric units of a functionalized acrylic monomer and/or a functionalized vinyl monomer and monomeric units of a vinyl monomer, and a second block, the second block comprising monomeric units of one or more vinyl monomers and monomeric units of the functionalized acrylic monomer and/or the functionalized vinyl monomer from the first block. A thermoset resin can be used instead of the thermoplastic resin.

In another aspect, U.S. patent application Ser. No. 11/711,206 provides a process for making a polymer/clay nanocomposite material, including mixing an organic clay and a block copolymer together in a ratio between the clay and the block copolymer of between 100:1 and 1:1000 to form a nanocomposite concentrate; mixing the nanocomposite concentrate and a functional polyolefin to form a polyolefin masterbatch; and mixing the polyolefin masterbatch and a thermoplastic polymer to obtain a polymer/clay nanocomposite material.

U.S. patent application Ser. No. 11/711,206 also describes a block copolymer having one block that is polar, hydrophylic and miscible in a clay slurry for use in clay production and another block that is nonpolar to increase the compatibility with a thermoplastic or thermoset resin. The block copolymer replaces conventional intercalate ammonium ions as well as conventional compatibilizers for a clay and thermoplastic or thermoset composite.

The present invention concerns an application where the parent invention is used in the preparation of inorganic tubule-polymer composites.

Silicate-polymer nanocomposites offer a number of significant advantages over traditional silicate-polymer composites. Conventional silicate-polymer composites usually incorporate a high content of the inorganic fillers—from 10 to as much as 50 weight percent (wt. %)—to achieve desired mechanical or thermal properties. Polymer nanocomposites can reach the desired properties, such as increased tensile strength, improved heat deflection temperature and flame retardance, with typically 3-5 wt. % of the nanofiller, producing materials with specific gravity close to that of the unfilled polymer, good surface appearance and better processability than traditional reinforcements. Other properties of nanocomposites such as optical clarity and improved barrier properties cannot be duplicated by conventionally-filled resins at any loading. (Bins & Associates, Plastics Additives & Compounding, 2002, 30-33.)

One general approach to prepare polymer nanocomposites is to employ planar layered clays, which consist of stacked aluminosilicate layers that can be separated. The clay layers, which are held together by electrostatic forces, cannot be broken into separate layers by simple shear, and for that reason, organic modification of the clay is necessary to achieve separation of the stacked clay layers. An organic modification that separates the stacked clay layers (intercalation and exfoliation) and that yields clay that has more affinity towards different polymeric matrices is actually a very active research area. U.S. Patent Application Pub. No. 2007/0106006, filed by Cooper at al. and incorporated by reference, referred to herein as "Cooper," describes the benefits of using mineral nanotubes as fillers, in contrast to the difficulties (intercalation and exfoliation) encountered when planar layered clays are incorporated in polymeric matrices. Nanotubes do not require exfoliation, since they are discrete nanoparticles, and they offer additional functionality via the inner open space or cavity of the tube, particularly the ability to incorporate active chemical agents within the tubes or to coat the tube surfaces.

Halloysite, which is also known as endellite or to avoid confusion, halloysite-10A, is a mineral from the kaolin group that exists in the form of hollow tubes. See Thomas F. Bates, F. A. H., Ada Swineford, *The American Mineralogist*, 1950, 35, (7 and 8), 463-484. See also Joussein, E.; Petit, S.; Churchman, J.; Theng, B.; Righi, D.; Delvaux, B., *Clay Minerals*, 2005, 40, (4), 383-426. Halloysite is not an uncommon aluminosilicate clay in nature being found in many countries, including the United States of America, Brazil, China, France, Japan, South Korea and Turkey. Halloysite tubules from different regions and within samples vary in dimensions, but all are very small with typical outside diameters ranging from 10 nm to 500 nm, with a median value of 70 nm (according to Thomas F. Bates, F. A. H., Ada Swineford, *The American Mineralogist*, 1950, 35, (7 and 8), 463-484) or 200 nm, according to Cooper. The diameters of the holes range from 20 nm to 200 nm and average 40 nm. The lengths of halloysite tubules cover a wide range from 20 nm to more than 40,000 nm, and are typically about 1,200 nm, according to Cooper. The structure and chemical composition of halloysite $(Al_2Si_2O_5(OH)_4 \cdot nH_2O)$ is similar to that of kaolinite, dickite or nacrite but the unit layers in halloysite are separated by a monolayer of water molecules. As a result, hydrated halloysite has a basal $(d_{001})$ spacing of 10 Å. Because the interlayer water is weakly held, halloysite-10 Å can readily dehydrate to give a corresponding halloysite-7 Å. Mismatch in the two-layered alignment of the tetrahedral sheet of silica bonded to the octahedral or gibbsite sheet of alumina causes the wall to curve into the cylindrical shape as explained by Bates et al. (Thomas F. Bates, F. A. H., Ada Swineford, *The American Mineralogist*, 1950, 35, (7 and 8), 463-484). Intercalated water may occur between the repetitive two-layered sheets comprising the spiral wall, which tends to be removed on drying. The indirect rehydratation of halloysite has been reported, forming an intermediary intersalation complex, followed by rinsing with water to remove the salt (Levis, S. R.; Deasy, P. B., International Journal of Pharmaceutics 2002, 243, 125-134). The inner and outer faces of the tubules walls carry normally a net negative charge, functioning as a polyvalent anion, whereas their edges are amphoteric with negative charge at high pH and positive charge at low pH. This unusual shape and charge distribution favors face-to-edge attachment in aqueous suspension below pH 6 and facilitates binding particularly of cations to the unreacted faces (Levis, S. R. and P. B. Deasy, International Journal of Pharmaceutics, 2002, 243, 125-134). Halloysite has a low specific surface area and cation exchange capacity, CEC (20-60 $cmol_ckg^{-1}$). Adsorption of cations and anions by halloysite is influenced by the final concentration of the electrolyte solution. Both the CEC and anion exchange capacity (AEC) increase with salt concentration in solution.

Halloysite is capable of adsorbing different salts in the interlayer such as $NH_4$-, K-, Cs- and Rb-salts, which gives rise to characteristic expansion of $d_{001}$ spacing (Wada, K., Soil and Plant Food 1958, 4, (3), 137-144.). The adsorption of As(V) has also been reported. Organic compounds can also be adsorbed, either into the hollow lumen or spiral space of microtubules. Examples include molecules such as: ethanol, methanol, glycerol, ethylene glycol, acetone, acetonirile, dimethylsoulfoxide, hydrazine hydrate, formaldehyde, acetamide, urea, benzene, cyclohexane and n-hexane (Levis, S. R. and P. B. Deasy, International Journal of Pharmaceutics, 2002, 243, 125-134; Joussein, E.; Petit, S.; Churchman, J.; Theng, B.; Righi, D.; Delvaux, B., *Clay Minerals*, 2005, 40, (4), 383-426; Carrasco-Marin, F.; Domingo-García, M.; Fernández-Morales, I.; López-Garzón, F. J., Journal of Colloid and Interface Science 1988, 126, (2), 552-560). The use of hollow mineral tubules selected form the group consisting of halloysite, cylindrite, boulangerite and imogolite to adsorb active molecules (drugs, fertilizers, antifouling agents, pesticides pheromones, biocide agents, antiscale, anticorrosion agents and combinations thereof) and then release them in a controlled fashion has also been described in several patents. See U.S. Pat. Nos. 4,019,934; 5,651,976; 5,705,191; and 6,401,816. Halloysite's lumen has also been modified to include cosmetic products that are released in a controlled fashion, including compounds such as moisturizing agents, local anesthetics, antiseptics, perfumes, skin repair ingredients and hair dissolver materials (U.S. Patent Application Pub. No. 2007/0292459). Halloysite has been treated with cationic polymeric coatings such as chitosan, polyethyleneimine related to drug delivery applications (Levis, S. R.; Deasy, P. B., International journal of pharmaceutics 2003, 253, (1-2), 145-157) or biodegradable biofouling release purposes (U.S. Patent Application Pub. No. 2007/0059273).

Halloysite has also been used, in combination with other clays, such as attapulguite, as catalyst support for the conversion of hydrocarbonaceous feedstocks, specially for demetalizing and hydroprocessing process (U.S. Pat. No. 4,364, 857) and as a template for metal nanoparticles and wires deposition (Fu, Y.; Zhang, L., Journal of Solid State Chemistry 2005, 178, 3595-3600).

Compared to other microtubules such as carbon nanotubules, halloysite has the advantage of being available worldwide at low cost. Halloysite can be obtained, for example, from Atlas Mining Company of Osburn, Id., USA.

Cooper described halloysite as a useful constituent of polymeric composites for the purpose of thermal improvement and mechanical properties improvement. See also Du, M.; Guo, B.; Jia, D., European Polymer Journal, 2006, 42, 1362-1369. In the case of nylon, halloysite has been modified with benzalkonium chloride before blending (Cooper's example 1) to obtain an improvement in modulus, but in the case of polypropylene, the use of compatibilizers such as maleic anhydride-graft-polypropylene copolymer did not improve the mechanical properties of the composite (Cooper's example 2). In order to improve the compatibility between polypropylene and halloysite, Ning et. al. introduced alkyl substituted quaternary ammonium, obtaining an improvement in the modulus when HNT is loaded in a 10% wt. Ning, N.-Y.; Yina, Q.-J.; Luoa, F.; Zhanga, Q.; Dua, R.; Fu, Q., Polymer 2007, 48, (25), 7374-7384. In the case of thermoset polymers, the use of natural halloysite in epoxy nanocomposites has been reported to increase the izod impact by Yea et. Al. (Yea, Y.; Chena, H.; Wua, J.; Yeb, L., Polymer 2007, 48, 6426-6433).

SUMMARY OF THE INVENTION

The present invention provides in one aspect an inorganic tubule-polymer composite material comprising inorganic tubules; a thermoplastic matrix, and a block copolymer as a compatibilizer, where the block copolymer has a composition that includes a first block, the first block comprising monomeric units of a functionalized acrylic monomer and/or a functionalized vinyl monomer and monomeric units of a vinyl monomer, and a second block, the second block comprising monomeric units of one or more vinyl monomers and monomeric units of the functionalized acrylic monomer and/ or the functionalized vinyl monomer from the first block. A thermoset resin can be used instead of the thermoplastic resin.

In another aspect, the present invention provides a process for making an inorganic tubule-polymer composite material, including mixing inorganic tubules and a block copolymer together in a ratio between the inorganic tubules and the block copolymer of between 10000:1 and 1:100 to form a composite concentrate; mixing the composite concentrate and a functional polyolefin to form a polyolefin masterbatch; and mixing the polyolefin masterbatch and a thermoplastic polymer to obtain a polymer—inorganic tubules composite material.

The present invention also provides a block copolymer having one block that is polar, hydrophilic and miscible in an inorganic tubules slurry production and another block that is nonpolar to increase the compatibility with a thermoplastic or thermoset resin. In this case the block copolymer of the present invention replaces conventional compatibilizers for thermoplastic or thermoset composites.

In one embodiment, the present invention provides a modified inorganic tubule composition that comprises from about 1 to about 99.999% wt of inorganic tubules and from about 0.001 to about 99% wt of a block copolymer according to the present invention. The block copolymer comprises a first block of charged monomers or monomers that upon a change in pH can become charged and monomeric units of a vinyl monomer and a second block of monomeric units of one or more vinyl monomers and monomeric units of the charged monomers or monomers that upon a change in pH can become charged from the first block. In another embodiment, the block copolymer comprises a first block comprising negatively charged monomers or monomers that upon pH change can become negatively charged and monomeric units of one or more vinyl monomers and a second block comprising monomeric units of one or more vinyl monomers.

In each case, the present invention provides inorganic tubule-polymer composite materials composed of modified inorganic tubules made according to the process of the present invention and either a thermoplastic resin or a thermoset resin.

DETAILED DESCRIPTION OF EXEMPLARY EMBODIMENTS

In contrast with the prior art, the inventors discovered, unexpectedly, that block copolymers that include a first block, which comprises monomeric units of a functionalized acrylic and/or functionalized vinyl monomer and monomeric units of a vinyl monomer, and a second block, which comprises monomeric units of one or more vinyl monomers and monomeric units of the functionalized acrylic and/or functionalized vinyl monomer from the first block, can improve the compatibility between inorganic tubules and thermoplastic or thermoset polymeric matrices. Further information on functionalized block copolymers and their use as compatibilizers is provided in parent U.S. patent application Ser. Nos. 11/711, 206, filed Feb. 26, 2007, and 11/508,407, filed Aug. 23, 2006, each of which is incorporated by reference in its entirety for all purposes.

The mechanism by which these block copolymers improve the compatibility of an inorganic tubules with a polymeric matrix is related to the way the structure of the block copolymer interacts with different chemical moieties present in polymer/inorganic tubules composites. One block of the copolymer is designed to have favorable chemical or physical interactions with the inorganic tubules of the composition, while the remaining block is designed to be miscible or reactive either towards the thermoplastic matrix, a functionalized olefin or one of the components of the thermoset matrix.

Thermoplastic Polymer Composites

In one embodiment, the present invention provides a method for preparing an inorganic tubule-polymer composite material by mixing together:
a) Inorganic tubules;
b) a block copolymer with a composition that includes a first block, which comprises monomeric units of a functionalized acrylic and/or functionalized vinyl monomer and monomeric units of a vinyl monomer, and a second block, which comprises monomeric units of one or more vinyl monomers and monomeric units of the functionalized acrylic and/or functionalized vinyl monomer from the first block; and
c) a thermoplastic matrix.

A functionalized polyolefin can be added to the mix if desired.

The inventors have unexpectedly found that in order to improve the interaction between the inorganic tubules and the thermoplastic matrix, it is preferable to mix the inorganic tubules with a functionalized block copolymer. This mixture enhances the interaction of the inorganic tubules chemical moieties of the block copolymer.

In one embodiment, the inorganic tubules (a) and the block copolymer (b) are mixed in a ratio between the inorganic tubules and the block copolymer of between 100,000:5 and 1:1000, preferably between 10,000:1 and 1:20 and more preferably between 10,000:4 and 1:100, preferably between 1,000:1 and 1:5 and more preferably between 1,000:2 and 1:1.

The inorganic tubules and the block copolymer can be mixed by bringing them into solution or by melt mixing the block copolymer with the inorganic tubules. If the inorganic tubules and the block copolymer are dissolved or dispersed in a solvent, the solvent may be selected from the group consisting of water, methanol, ethanol, propanol, isopropanol, ethyleneglycol, 1,4-butanediol, glycerin, dimethyl sulfoxide, N,N-dimethylformamide, acetic acid, formic acid, pyridine, aniline, phenol, nitrobenzene, acetonitrile, acetone, methyl ethyl ketone, chloroform, carbon disulfide, propylene caronate, 2-methoxyethanol, ether, carbon tetrachloride, n-hexane, and combinations thereof. The solution or dispersion should be stirred, and it should be heated, if necessary. The solvent should be evaporated or devolatilized to yield a composite concentrate. If the inorganic tubules and the block copolymer are melt mixed to form a composite concentrate, preferably the mixing equipment is a co-rotating twin-screw extruder. The extruder should be capable of screw speeds ranging from about 50 to about 2,000 rpm. The temperature profile from the barrel number two to the die should range from the melting temperature of the thermoplastic matrix polymer to about 300° C., typically between 180° C. to around 300° C., preferably between 180° C. and 250° C. and more preferably between 190° C. and 220° C. The composites concentrate can be pulverized or pelletized for later use.

The composite concentrate can then be either directly incorporated into the thermoplastic polymeric matrix as a first option or optionally reacted with a functionalized polyolefin to form a polyolefin master batch as a second option.

In the first option, the block copolymer of the composite concentrate interacts with the thermoplastic matrix either by reacting with the thermoplastic polymeric matrix or by intermolecular forces or weak interactions (dipole-dipole interactions including hydrogen bonding, dipole-induced dipole, London forces, transitory forces or van der Waals' forces) when the polarity of the block copolymer is similar to the polarity of the thermoplastic and both components are compatible. In a specific embodiment, the composite concentrate can be diluted in any ratio that one skilled in the art desires to yield as a final inorganic tubules concentration in a thermoplastic polymer matrix. One way of dilution is with a twin-screw extruder from any number of sources or a continuous mixer. Another way of dilution is mixing the composite concentrate pellets or powder at the point of molding the final article. The amount of inorganic tubules incorporated in the thermoplastic polymer is between 0.05% and 80%, preferably between 0.5% and 60% and more preferably between 0.5% and 45% by weight. In one embodiment the concentration of inorganic tubules in the thermoplastic matrix is between 1 and 30% wt, and in another it is between 3 and 25% wt.

In the second option, the composite concentrate can be reacted with a functionalized polyolefin, forming a polyolefin masterbatch that can be easily dispersed into a thermoplastic matrix to render a composite with improved properties. This strategy is especially useful for the case of polypropylene/inorganic tubules composites, where a maleic anhydride grafted polyolefin is typically added as a compatibilizer to improve compatibility between the inorganic tubules and the polymeric matrix. In the present invention, the addition of the block copolymer has several advantages. It improves miscibility between the polypropylene matrix and the treated inorganic tubules by forming comb or block copolymers with the functional polyolefin. Typical compatibilizers used in polypropylene composites are low molecular weight compounds, thus their incorporation into a polypropylene matrix usually causes a detriment in mechanical properties of the whole composite, and it also increases significantly the cost of the final product. In the present invention, the maleic anhydride grafted polyolefin is added in a low concentration, and therefore mechanical properties are less affected by the presence of this component.

When a functionalized polyolefin is used in the composition, the reaction step between the mixture of inorganic tubules/block copolymer and the functionalized polyolefin is important, since it defines the final degree of dispersion (exfoliation) of the final composite. The block copolymer contains typically reactive groups that can react with the functional groups of the functional polyolefins. When the polyolefin has grafted functional groups, the block copolymer will react with these groups and produce a comb copolymer with a polyolefin backbone that is miscible with polyolefin matrices and one or more grafted block copolymers, which possess one block miscible or reactive with the inorganic tubules. When the polyolefin has terminal functional groups, its reaction with the block copolymer will produce another block copolymer possessing one polyolefin block, which is miscible with polyolefin matrices, and another block miscible, reactive or compatible with the inorganic tubules. In the case of the maleic anhydride functional polyolefins, we have found that a previous treatment in the presence of catalytic amounts of acids, preferably Lewis acids, improves its reactivity towards the functional block copolymer. Preferably, the pre-treatment includes water, either as crystallization molecules included in the acid molecule or as an additional component. The ratio between the acid molecule and additional water is preferably between 0.1 and 5. The maleic anhydride functional polyolefin is preferably treated with 0.01% to about 10% acid by weight. The catalyst can be either used to pre-treat the functional polyolefin or added directly when the inorganic tubules/block copolymer mixture is incorporated with the functional polyolefin. If the block copolymer has an anhydride as the functional group and the functional polyolefin has other functional groups such as epoxy, the catalyst can also be used to pre-treat the block copolymer/inorganic tubules mixture or added directly when the functional polyolefin is incorporated to yield a polyolefin masterbatch.

In another embodiment, the inorganic tubules (a), the block copolymer (b) and a functional polyolefin are mixed using an amount of inorganic tubules between 0.1% and 80%, preferably between 1% and 60% and more preferably between 3% and 50% by wt. The ratio between the inorganic tubules and the block copolymer is between 10,000:4 and 1:100, preferably between 1,000:1 and 1:5 and more preferably between 1,000:2 and 1:1. The components can be mixed in solution or melt mixed. If the inorganic tubules and the block copolymer are dissolved or dispersed in a solvent, the solvent may be selected from the group consisting of water, methanol, ethanol, propanol, isopropanol, ethyleneglycol, 1,4-butanediol, glycerin, dimethyl sulfoxide, N,N-dimethylformamide, acetic acid, formic acid, pyridine, aniline, phenol, nitrobenzene, acetonitrile, acetone, methyl ethyl ketone, chloroform, carbon disulfide, propylene caronate, 2-methoxyethanol, ether, carbon tetrachloride, n-hexane and combinations thereof. The solution or dispersion should be stirred, and it should be heated, if necessary. The solvent should be evaporated or devolatilized to yield a composite concentrate. If the inorganic tubules, the block copolymer and functional polyolefin are melt mixed, preferably, the mixing equipment is a co-rotating twin-screw extruder. The product can be pelletized or pulverized for its use as a polyolefin composite master batch.

In a specific embodiment, the inorganic tubules (a), the block copolymer (b) and a functional polyolefin are mixed using an amount of inorganic tubules between 3% wt and 40% wt, an amount of block copolymer between 0.003% wt and 33% wt and an amount of functional polyolefin between 27% wt and 97%.

In a more specific embodiment, the inorganic tubules (a), the block copolymer (b) and a functional polyolefin are mixed using an amount of inorganic tubules between 10% wt and 20% wt, an amount of block copolymer between 0.01% wt and 17% and an amount of functional polyolefin between 63% wt and 90% wt.

In another embodiment, the functional polyolefin is pre-treated with 0.5-10% wt of an acid molecule, and optionally with 0.5-20% wt of water, preferably with 0.5-5% wt of an acid molecule and 0.5-10% wt of water. The acid is preferably a Lewis acid. Zinc acetate can be used as the Lewis acid.

The functional polyolefin can be mixed with the acid by bringing them in solution or by melt mixing. If they are melt mixed, the mixing equipment is preferably a co-rotating twin-screw extruder. The temperature is between 110° C. and 200° C., preferably between 130° C. and 180° C., and more preferably between 130° C. and 160° C.

In one embodiment the polyolefin composite master batch can be used to modify polyolefins yielding polyolefin composites. The polyolefin composite master batch can be melt mixed with the polyolefin, and preferably, the mixing equipment is a co-rotating twin-screw extruder. The amount of inorganic tubules incorporated in the polyolefin is between 0.15% and 28%, preferably between 1.5% and 20% and more preferably between 1.5% and 18%. In one case, the amount of polyolefin composite master batch incorporated in the polyolefin is between 5% wt and 70% wt, and in other it is between 110% wt and 50% wt.

In a specific embodiment the composition of the polyolefin composites is between 0.15% wt to 28% wt of the inorganic tubules, between 0.0001% wt to 23% wt of the block copolymer, between 1.33 to 68% wt of the functional polyolefin and between 30 to 95% wt of a polyolefin.

In another embodiment, the inorganic tubules (a), the block copolymer (b) and a thermoplastic polymer are mixed using an amount of inorganic tubules between 0.1% and 50%, preferably between 0.5% and 30% and more preferably between 1.5% and 20 wt. %. The ratio between the inorganic tubules and the block copolymer of between 10,000:4 and 1:100, preferably between 1,000:1 and 1:5 and more preferably between 1,000:2 and 1:1. In another embodiment, the inorganic tubules (a), the block copolymer (b) and a thermoplastic polymer are mixed using an amount of inorganic tubules between 3% wt to 20% wt, and an amount of block copolymer between 0.003% wt to 17% wt and an amount of thermoplastic polymer between 63% wt and 97% wt.

The components can be mixed by bringing them in solution or by melt mixing the block copolymer and the thermoplastic polymer with the inorganic tubules. If the inorganic tubules, the block copolymer and the thermoplastic matrix are melt mixed, the mixing equipment is a co-rotating twin-screw extruder. The extruder should be capable of screw speeds ranging from about 50 to about 2,000 rpm.

In a more specific embodiment, the inorganic tubules are halloysite, the functional acrylic monomer in the block copolymer is glycidyl methacrylate, the functional polyolefin is a maleated polyolefin, the Lewis acid is zinc acetate, and the thermoplastic polymer is polypropylene. Preferably, halloysite ranges from 3 wt % to 10 wt %, the functional acrylic monomer in the block copolymer is glycidyl methacrylate and the block copolymer ranges from 3 wt % to 10 wt %, the functional polyolefin is a maleated polyolefin ranging from 2 wt % to 20 wt %, the Lewis acid is zinc acetate, and the thermoplastic polymer is polypropylene in the range of 62 wt % to 92 wt %.

In another embodiment, the inorganic tubules (a), the block copolymer (b), the thermoplastic matrix (d) and the functionalized polyolefin (e) are mixed using an amount of inorganic tubules between 0.05% and 80%, preferably between 0.5% and 60% and more preferably between 0.5% and 45% by weight. 10,000:4 and 1:100, preferably between 1,000:1 and 1:5 and more preferably between 1,000:2 and 1:1. The amount of functionalized polyolefin in the thermoplastic matrix is between 1% and 80%, preferably between 2% and 50% and more preferably between 2% and 25 wt. %.

In a more specific embodiment, the amount of inorganic tubules is between 2% wt and 20% wt, the ratio between the inorganic tubules and the block copolymer is between 100:30 to 1:5 and the amount of functional polyolefin in the thermoplastic matrix is between 5 and 20% wt.

In another embodiment, the functional polyolefin is previously treated with 0.5-10% wt of an acid molecule, and optionally with 0.5-20% wt of water, preferably with 0.5-5% wt of an acid molecule and 0.5-10% wt of water.

Examples of functional groups contained in the functionalized polyolefin include, but are not limited to, anhydride, epoxy, hydroxy, amine and acid. The components can be melt mixed, and preferably, the mixing equipment is a co-rotating twin-screw extruder. The thermoplastic matrix is preferably a polyolefin.

The inorganic tubules of the present invention can be any natural, synthetic or modified inorganic tubules. Examples of inorganic tubules include mineral microtubules, mineral microtubes, mineral nanotubules, and mineral nanotubes such as halloysite, cylindrite, boulangerite, or imogolite.

In one embodiment of the invention, the inner diameter of the microtubules varies from about 20 nm to 200 nm and average about 40 nm. In another preferred embodiment, of the invention, the inner diameter of the microtubules varies from about 200 Angstroms to about 1000 Angstroms.

Inorganic tubules are typically rolled layers in a form similar to a scroll and have two or more overlapping layers with an interlayer space between the layers. Inorganic tubules have a lumen, which has an inner surface. Inorganic tubules include modified inorganic tubules containing one or more molecules introduced either in the interlayer space or into the inner surface of the lumen. Examples of such molecules and/or modifications include, but are not limited to, ammonium salts, potassium salts, cesium salts, rubidium salts, iron salts, silver salts, copper salts or any transition metal salt, organometallic compounds, coordination compounds, inorganic compounds, conductive materials, flame retardant materials, agents for elution minerals, light emitting substance such as fluorescent or phosphorescent substances, colorants, antioxidants, emulsifiers, antifungal agents, pesticides, fragrances, dyes, optical brighteners, self-healing polymers, colorants, plasticizers, active agents including: antibiotics, antihelmetics, antifouling compounds, dyes, enzymes, peptides, bacterial spores, fungi, hormones, herbicides including: tri-chloro compounds (triox, ergerol), isothiazoline, and chloroth biocides. Pesticides include malathion, spectricide, and rotenone. Suitable antibiotics include albacilin, amforol, amoxicillin, ampicillin, amprol, ariaprime, aureomycin, aziumycin, chloratetracycline, oxytetracycline, gallimycin, fulvicin, garacin, gentocin, liquamicin, lincomix, nitrofurizone, penicillin, sulfamethazine, sulfapyridine, fulfaquinoxaline, fulfathiozole, and sulkamycin. Suitable antihelmetics include ivermictin, vetisulid, trichorofon, tribrissen, tramisol, topazone, telmin, furox, dichlorovos, anthecide, anaprime, acepromazine, pyrantel tartrate, trichlofon, fanbentel, benzimidazoles, and oxibenzidole. Suitable antifouling agents include ergerol, triazine, decanolactone, angelicalactone, galactilone, any lactone compound, capsicum oil, copper sulphate, isothiazalone, organochlorine compounds, organotin compounds, tetracyclines. Carriers are selected in view of their viscosity and the solubility of the active agent in the carrier. The carrier typically should possess a sufficiently low viscosity to fill the lumen of the microstructure. Alternatively, a low viscosity carrier precursor may be used, and the carrier formed in situ. For example, the lumen may be filled with a low viscosity monomer, and this monomer subsequently may be polymerized inside the lumen. Accordingly, suitable carriers include low molecular weight polymers and monomers, such as polysaccharides, polyesters, polyamides, nylons, polypeptides, polyurethanes, polyethylenes, polypropylenes, polyvinylchlorides, polystyrenes, polyphenols, polyvinyl pyrollidone, polyvinyl alcohol, ethyl cellulose, guar gum, polyvinyl formal resin, water soluble epoxy resins, quietol 651/nma/ddsa, aquon/ddsa/nsa, urea-formaldehyde, polylysine, chitosan, and polyvinylacetate and copolymers and blends thereof. Additionally, inorganic tubules include modified inorganic tubules containing one or more molecules, one or more metals, one or more inorganic compounds, one or more organometallic or coordination compounds and combinations thereof introduced either in the interlayer or into the inner surface of the lumen of a mineral microstructure.

The block copolymer (b) of the present invention can be synthesized as described in the parent patent documents. The parent patent document describes a process for producing a block copolymer, comprising reacting an acrylic monomer having functional groups and one or more vinyl monomers in the presence of a free radical initiator and a stable free radical in a first step to form a reaction product, wherein the reaction product includes residual unreacted acrylic monomer; and reacting in a second step one or more vinyl monomers with the reaction product from the first step to form a second block, wherein the second block incorporates the residual unreacted acrylic monomer. In the present invention the first block can include not only acrylic monomer that has functional groups but also, more generally, vinyl monomer that has functional groups. The first block can have one or the other or both of acrylic monomer or vinyl monomer, each with functional groups. It is appreciated that an acrylic monomer is a vinyl monomer, but both terms are used for the sake of clarity.

The block copolymer (b) preferably has a first block of a random copolymer with a total length between 1 and 720 monomeric units and a second block that incorporates residual monomers left over from polymerizing the first block and one or more additional monomers, where the second block has a length between 100 and 2000 monomeric units. The functional groups contained in the functional vinyl (—C=C—) or functional acrylic (C=C—CO—) monomers include, but are not limited to, epoxy, acid, anhydride, amine, amide and hydroxyl groups. Preferred functional vinyl monomers are functional aromatic vinyl monomers. Preferred acrylic monomers that have functional groups include glycidyl methacrylate, acrylic acid, methacrylic acid, 2-hydroxyethyl methacrylate, maleic anhydride, 2-dimethylaminoethyl methacrylate and 2-diethylaminoethyl methacrylate.

Examples of vinyl monomers contained in the block copolymer are styrene, substituted styrenes, ethylene, isoprene, isobutylene, butadiene, acrylates, methacrylates, alkyl substituted acrylates, aryl substituted acrylates, alkyl substituted methacrylates, aryl substituted methacrylates, acrylonitrile, maleic anhydride, acrylonitrile, N-aromatic substituted maleimides, N-alkyl substituted maleimides, acrylic acid, methyl methacrylate, and 2-hydroxyethyl methacrylate.

In one embodiment, the functional acrylic monomer is glycidyl methacrylate, and the vinyl monomer is styrene. In one embodiment, the functional acrylic monomer is acrylic acid, and the vinyl monomer is styrene.

The thermoplastic matrix polymer can be any thermoplastic suitable for molding or extruding operations where lightness, stiffness and toughness are desired as performance properties. Non-limiting examples of such polymers are polyolefins, polyamides, polyesters, polyurethanes, styrenic polymers, polycarbonates, polyvinyl halides and combinations thereof.

Preferably, the mixing equipment is a co-rotating twinscrew extruder. The extruder should be capable of screw speeds ranging from about 50 to about 2,000 rpm. The temperature profile from the barrel number two to the die should range from the melting temperature of the thermoplastic matrix polymer to about 270° C. and preferably from around 200° C. The nanocomposites can be pulverized or pelletized for later use.

Those skilled in the art of preparing polymer composites recognize the need to add optional components to a inorganic composite formulation. Such optional ingredients in the present invention include colorants (dyes or pigments), nucleating agents or nucleators, blowing agents, impact modifiers, chain extenders, antistatic agents, activators that lower the activation temperature of the blowing agent, surfactants, plasticizers, stabilizers, flame retardants, UV absorbers, fillers, fragrances, mold release aids, processing aids, biocides, antistatic additives, anti-microbial agents, lubricants and combinations thereof.

Thermoset Polymer Composites

In another embodiment, the present invention provides a method for preparing polymer/inorganic tubules composites by incorporating:
  a) inorganic tubules;
  b) a block copolymer with a composition that includes a first block, which comprises monomeric units of a functionalized acrylic or functionalized vinyl monomer and monomeric units of a vinyl monomer, and a second block, which comprises monomeric units of one or more vinyl monomers and monomeric units of the functionalized acrylic or functionalized vinyl monomer from the first block; and
  c) one or more components that can polymerize to render a thermoset matrix.

The inventors have unexpectedly found that in order to improve the interaction between the inorganic tubules and the thermoset matrix, it is preferable to mix the inorganic tubules with a functionalized block copolymer. This mixture enhances the interaction between the inorganic tubules chemical moieties and the block copolymer.

In one embodiment, the inorganic tubules (a) and the block copolymer (b) are mixed in a ratio between the inorganic tubules and the block copolymer of between 10,000:4 and 1:100, preferably between 1,000:1 and 1:5 and more preferably between 1,000:2 and 1:1.

The inorganic tubules and the block copolymer can be mixed by bringing them into solution or by melt mixing the block copolymer with the inorganic tubules. If the inorganic tubules and the block copolymer are dissolved or dispersed in a solvent, the solvent can be selected from the group consisting of water, methanol, ethanol, propanol, isopropanol, ethyleneglycol, 1,4-butanediol, glycerin, dimethyl sulfoxide, N,N-dimethylformamide, acetic acid, formic acid, pyridine, aniline, phenol, nitrobenzene, acetonitrile, acetone, methyl ethyl ketone, chloroform, carbon disulfide, propylene caronate, 2-methoxyethanol, ether, carbon tetrachloride, n-hexane, and combinations thereof. The solution or dispersion should be stirred, and it should be heated, if necessary. The solvent should be evaporated or devolatilized to yield a composite concentrate. If the inorganic tubules and the block copolymer are melt mixed to form a composite concentrate, preferably the mixing equipment is a co-rotating twin-screw extruder. The extruder should be capable of screw speeds ranging from about 50 to about 2,000 rpm. The temperature profile from the barrel number two to the die should range from the melting temperature of the thermoplastic matrix polymer to about 300° C., typically between 180° C. to around 300° C., preferably between 180° C. and 250° C. and more preferably between 190° C. and 220° C. The composite concentrate can be pulverized or pelletized for later use.

In one embodiment, the inorganic tubules (a) the block copolymer (b) and one or more different components that can polymerize to render thermoset matrices (c) are mixed in bulk or solution. The ratio between the inorganic tubules and the block copolymer is between 10,000:4 and 1:100, preferably between 1,000:1 and 1:5 and more preferably between 1,000:2 and 1:1. The amount of inorganic tubules relative to the total amount of monomers added is between 0.05% and 80%, preferably between 0.5% and 60% and more preferably between 0.5% and 45% by weight.

In one embodiment the ratio between the inorganic tubules and the block copolymer is between 1,000:2 and 1:1, and the amount of inorganic tubules relative to the total amount of monomers added is between 0.5% and 40%, preferably between 3% and 30% by weight.

In one embodiment the composition of the thermoset/inorganic tubules composite has inorganic tubules between 3% wt to 30% wt, block copolymer between 0.003% wt to 33% wt and an amount of components that can polymerize to render a thermoset matrix between 34% wt and 97% wt.

In another embodiment the composition of the thermoset/inorganic tubules composite has an inorganic tubules content between 3% wt to 15% wt, a block copolymer content between 0.003% wt to 30% wt and an amount of components that can polymerize to render a thermoset matrix between 55% wt and 97% wt.

Thermoset/inorganic tubules composites can include optionally additional additives, additional fillers and combinations thereof. Fillers include, but are not limited to, metal oxides such as iron and nickel oxide, nonmetals such as carbon fiber, silicates, aluminosilicates, titanium dioxide, glass flakes, glass beads, glass fibers, polymer fibers, other tubular or fibrous clays, inorganic clays, organic clays, carbon black, carbon nanotubes, nanofillers, talc, mica and combinations thereof. Additives include, but are not limited to, stabilizers, flame retardants, anti-oxidants, processing aids, lubricants, dispersing agents, viscosity reducers, pigments and combinations thereof. Additives and fillers are used in normal and conventional amounts, dependent upon the desired end-use.

In one embodiment the additional filler is fiber glass. In a specific embodiment, fiber glass is between 5% wt to 80% wt of the inorganic tubules/thermoset composite, in a more specific embodiment fiber glass is between 10 and 60% wt and in a more specific embodiment fiber glass is between 40 and 50% wt of the thermoset resin composite.

In one embodiment the thermoset/inorganic tubules composite composition includes additional fillers, additional additives, one or more solvents, one or more monomers, one or more catalysts, and one or more accelerators. In a more specific embodiment the thermoset/inorganic tubules composite composition includes inorganic tubules between 3% wt and 15% wt, block copolymers between 0.001% wt and 30% wt, components that can polymerize to render a thermoset matrix between 55% wt and 97% wt. The ratio between the inorganic tubules/thermoset resin/block copolymer and additional fillers is between 100:30 and 100:65.

In a more specific embodiment, the resin is isophthalic resin between 60 and 80% wt, the additional monomer is styrene between 0.5 and 15% wt, additional fillers are between 5 and 40% wt, inorganic tubules are between 0.5 and 15% wt, and initiators between 0.01% to 5% wt. The product is cured using UV radiation in one embodiment, but a heat cure may be adequate.

In another embodiment, the inorganic tubules (a) and the block copolymer (b) are mixed in a ratio between 10,000:4 and 1:100, preferably between 1,000:1 and 1:5 and more preferably between 1,000:2 and 1:1. The inorganic tubules and the block copolymer can be mixed by bringing them in solution or by melt mixing the block copolymer with the inorganic tubules. If the inorganic tubules and the block copolymer are dissolved or dispersed in a solvent, the solvent may be selected from the group consisting of water, methanol, ethanol, propanol, isopropanol, ethyleneglycol, 1,4-butanediol, glycerin, dimethyl sulfoxide, N,N-dimethylformamide, acetic acid, formic acid, pyridine, aniline, phenol, nitrobenzene, acetonitrile, acetone, methyl ethyl ketone, chloroform, carbon disulfide, propylene caronate, 2-methoxyethanol, ether, carbon tetrachloride, n-hexane, and combinations thereof. The solution or dispersion should be stirred, and it should be heated, if necessary. The solvent should be evaporated or devolatilized to yield a composite concentrate. If the inorganic tubules and the block copolymer are melt mixed to form a composite concentrate, the mixing equipment is preferably a co-rotating twin-screw extruder. The extruder should be capable of screw speeds ranging from about 50 to about 2,000 rpm. The temperature profile from the barrel number two to the die should range from the melting temperature of the thermoplastic matrix polymer to about 270° C. and preferably from around 200° C. The composite concentrate can be pulverized or pelletized and then mixed with one or more different components that can polymerize to render thermoset matrices (c). The ratio between the inorganic tubules and the block copolymer is between 10,000:4 and 1:100, preferably between 1,000:1 and 1:5 and more preferably between 1,000:2 and 1:1. The amount of inorganic tubules relative to the total amount of monomers added is between 0.05% and 80%, preferably between 0.5% and 60% and most preferably between 0.5% and 45%.

In one embodiment the composition of the thermoset/inorganic tubules composite has inorganic tubules between 3% wt to 30% wt, block copolymer between 0.001% wt to 60% wt and an amount of components that can polymerize to render a thermoset matrix between 110% wt and 97% wt.

In another embodiment the composition of the thermoset/inorganic tubules composite is a inorganic tubules content between 3% wt to 15% wt, a block copolymer content between 0.003 to 17% wt to 30% wt and an amount of components that can polymerize to render a thermoset matrix between 68% wt and 97% wt.

Thermoset/inorganic tubules composites can include optionally additional additives, additional fillers and combinations thereof. Fillers include, but are not limited to, metal oxides such as iron and nickel oxide, nonmetals such as carbon fiber, silicates, aluminosilicates, titanium dioxide, glass flakes, glass beads, glass fibers, polymer fibers, other tubular or fibrous clays, inorganic clays, organic clays, carbon black, carbon nanotubes, nanofillers, talc, mica and combinations thereof. Additives include, but are not limited to, stabilizers, flame retardants, anti-oxidants, processing aids, lubricants, dispersing agents, viscosity reducers, pigments and combinations thereof. Additives and fillers are used in normal and conventional amounts, dependent upon the desired end-use.

In one embodiment the additional filler is fiber glass. In a specific embodiment, fiber glass is between 5% wt to 80% wt of the inorganic tubules/thermoset composite, in a more specific embodiment fiber glass is between 10 and 60% wt and in a more specific embodiment fiber glass is between 40 and 50% wt of the thermoset resin composite In one embodiment the thermoset/inorganic tubules composite composition includes additional fillers, one or more solvents, one or more monomers, one or more catalysts, and one or more accelerators. In a more specific embodiment the thermoset/inorganic tubules composite composition includes inorganic tubules between 3% wt and 15% wt, block copolymers between 0.001% wt and 30% wt, components that can polymerize to render a thermoset matrix between 55% wt and 97% wt. The ratio between the inorganic tubules/thermoset resin/block copolymer and additional fillers is between 100:30 and 100:65.

In a more specific embodiment, the resin is isophthalic resin between 60 and 80% wt, the additional monomer is styrene between 0.5 and 15% wt, additional fillers are between 5 and 40% wt, inorganic tubules are between 0.5 and 15% wt, and initiators between 0.01% to 5% wt. The product is preferably cured using UV radiation or heat.

Thermoset matrices include but are not restricted to isophthalic resins, epoxy resins, unsaturated polyester, epoxypolyester resins, therephthalic resins, polyurethane resins, polyesters, epoxy/polyester hybrids, melamine, silicones, acrylic polymers, urethanes, phenolic resins, polyamide resins, alkyd resins, furan resins, urea resins, aniline resins and combinations thereof. Polymerization of components that can polymerize to render a thermoset matrix is carried out in various ways depending on the type of monomer selected.

Inorganic tubules include modified inorganic tubules containing one or more molecules introduced either in the interlayer or into the inner surface of the lumen of a mineral microstructure. Examples of such molecules and/or modifications are described above.

The block copolymer (b) of the present invention can be synthesized as described in the parent patent documents. The parent patent document describes a process for producing a block copolymer, comprising reacting an acrylic monomer having functional groups and one or more vinyl monomers in the presence of a free radical initiator and a stable free radical in a first step to form a reaction product, wherein the reaction product includes residual unreacted acrylic monomer; and reacting in a second step one or more vinyl monomers with the reaction product from the first step to form a second block, wherein the second block incorporates the residual unreacted acrylic monomer. In the present invention the first block can include not only acrylic monomer that has functional groups but also, more generally, vinyl monomer that has functional groups. The first block can have one or the other or both of acrylic monomer or vinyl monomer, each with functional groups. It is appreciated that an acrylic monomer is a vinyl monomer, but both terms are used for the sake of clarity.

The block copolymer (b) preferably has a first block of a random copolymer with a total length between 1 and 720 monomeric units and a second block that incorporates residual monomers left over from polymerizing the first block and one or more additional monomers, where the second block has a length between 100 and 2000 monomeric units. The functional groups contained in the functional vinyl (—C═C—) or functional acrylic (C═C—CO—) monomers include, but are not limited to, epoxy, acid, anhydride, amine, amide and hydroxyl groups. Preferred functional vinyl monomers are functional aromatic vinyl monomers. Preferred acrylic monomers that have functional groups include glycidyl methacrylate, acrylic acid, methacrylic acid, 2-hydroxyethyl methacrylate, maleic anhydride, 2-dimethylaminoethyl methacrylate and 2-diethylaminoethyl methacrylate.

Examples of vinyl monomers contained in the block copolymer are styrene, substituted styrenes, ethylene, isoprene, isobutylene, butadiene, acrylates, methacrylates, alkyl substituted acrylates, aryl substituted acrylates, alkyl substituted methacrylates, aryl substituted methacrylates, acrylonitrile, maleic anhydride, acrylonitrile, N-aromatic substituted maleimides, N-alkyl substituted maleimides, acrylic acid, methyl methacrylate, and 2-hydroxyethyl methacrylate.

In one embodiment, the functional acrylic monomer is an amine containing monomer, and the vinyl monomer is styrene. In another embodiment, the functional acrylic monomer is acrylic acid, and the vinyl monomer is styrene. In one embodiment, the functional acrylic monomer is an amine containing monomer, and the vinyl monomer is substituted styrene. In another embodiment, the functional acrylic monomer is an amine containing monomer, and the vinyl monomer is glicidyl methacrylate. In another embodiment, the functional acrylic monomer is an amine containing monomer and the vinyl monomer is an alkyl substituted acrylate or methacrylate. In another embodiment halloysite is modified in order to deliver three or more active agents in sequence.

Amphiphilic Block Copolymer

Another object of this invention is to provide a process for the modification of inorganic tubules by bringing into contact inorganic tubules, a block copolymer that has a composition that includes a first block, which comprises monomeric units of a functionalized acrylic or functionalized vinyl monomer and monomeric units of a vinyl monomer, and a second block, which comprises monomeric units of one or more vinyl monomers and monomeric units of the functionalized acrylic or functionalized vinyl monomer from the first block.

The block copolymer of the present invention can be formed with a block that is hydrophilic, which contains some degree of polarity so as to be miscible with the aqueous process for purifying the inorganic tubules, and another block that is compatible or miscible with the polymer matrix with which the inorganic tubules will be mixed. Considering that the use of inorganic tubules as polymer modifiers is very recent, and that some patents claim that they can modify polymers by adding them directly to the polymeric matrix, nowadays, inorganic tubules producers do not include inorganic tubules modification during their purification process from mines to the final product.

Some of the advantages of using the block copolymers of the present invention to modify inorganic tubules prior to using them as fillers of polymer composites are:

1) In solution, inorganic tubules tend to disperse, so the charged monomers of the block copolymer can interact more effectively with each of the inorganic tubules, avoiding the formation of inorganic tubule aggregates. The effective interaction is also reflected in a low amount of extractable block copolymer 2) One block of the block copolymers is designed to be reactive or miscible with the polymeric matrix, optimizing the interaction between the inorganic tubules and the matrix and eliminating the use of additional compatibilizers.

3) In contrast with pure diblock copolymers, such U.S. Patent Application Pub. No. 20060160940, filed by Muhlebach et al. and incorporated by reference, the presence of residual functional monomers in the block copolymers of the present invention help to improve solubility of the block copolymer in the dispersion media. This is especially important when the dispersion media is water, since the block miscible or reactive with the polymer matrix usually contains monomers with low polarity, which is not water soluble. The amount of residual functional monomers in the polymer miscible block can be adjusted in order to obtain an optimal balance between having a water soluble block copolymer and preserving the miscibility with the polymer matrix.

4) Block copolymers can be directly incorporated into the inorganic tubules manufacturers' actual process, since they merely constitute an additional step before drying. They can be added directly to the inorganic tubules slurry during or after its purification process, or they can be previously dissolved or dispersed in a dispersion medium, which is preferably water, and then added to the inorganic tubules slurry.

Another object of this invention is to provide a process for the modification of inorganic tubules by bringing into contact inorganic tubules and a block copolymer that has a composition that includes a first block, which comprises monomeric units having a negative charge or monomers that upon pH change become negatively charged and a second block, which comprises monomeric units of one or more vinyl monomers.

In contrast with other clays such as montmorillonite, inorganic tubules, such as halloysite, can bear a positive charge at low pH, allowing the interaction with negatively charged molecules such as block copolymers, which can improve the compatibility between the tubule and a polymeric matrix.

With reference to as U.S. Patent application No. 20060163160, filed by Weiner et al. and incorporated by reference, which is referred to herein as "Weiner" and which concerns inorganic tubules purification, in one embodiment of the present invention, a process for separating an inlet stream of a liquid slurry of suspended particles flowing into a cross-flow filter into a decantate stream and a filtrate stream, where the suspended particles comprise microtubular particles, comprises of the steps of:

a) comminuting said suspended particles in said inlet stream, thereby releasing the microtubular particles into the inlet stream by using at least a first sonicator to sonicate the inlet stream, thereby producing a sonicated inlet stream;

b) causing the sonicated inlet stream to flow along a filter medium of the cross-flow filter, where c) the slurry is either 1) intermixed with the charged block copolymer of the present invention, dry or with solvent, and the reaction slurry may again be subjected to high shearing by one or more passes through the mill or other mentioned instrumentalities or 2) mixed with the neutral block copolymer of the present invention, dry or with solvent, and then the pH of the reaction slurry can be adjusted; and d) applying high frequency oscillatory energy to the filter medium of said cross-flow filter while a portion of the slurry flows through the filter medium to produce a filtrate, where the concentration of the microtubular particles in the filtrate is greater than the concentration of the microtubular particles in the sonicated inlet stream.

In one embodiment, the inorganic tubules are purified as described by Weiner. The process begins with the step of mining of halloysite raw clay. In the as-mined condition, the raw halloysite clay comprises halloysite platelets, halloysite tubules and various undesired other heterogeneous material, i.e. rocks and dirt comprised of other minerals. In such cases as when the raw mined clay is comprised of numerous large solid objects, e.g. large rocks and/or large chunks of clay, the raw mined clay may undergo an initial comminution step wherein such large structures or lumps are crushed down into smaller, more uniformly sized pieces that can be further processed. In the initial comminution step, the maximum size of lumps in the mined raw clay is reduced down to no greater than about one inch. Initial comminution, when utilized, is followed by secondary and/or tertiary comminution/crushing. The objective of secondary/tertiary crushing is to break the mined clay and entrained foreign material (rocks/lumps comprising other minerals) down to a size that is granular, wherein the foreign material has fractured from and is thus separable from the halloysite clay. It is also preferable that the secondary/tertiary crushing breaks the mined clay down to a granule size that is several orders of magnitude greater that the length dimension of a halloysite microtubule, i.e. on the order of about 0.1 inch or about 2 millimeters.

Following secondary/tertiary crushing is the optional step of initial purification. In this step, a separation is made wherein particles consisting essentially of halloysite clay are separated from particles consisting of other minerals and/or other foreign material. In one embodiment wherein a large share of the foreign material is of a different specific gravity than the halloysite clay particles, the crushed material from secondary/tertiary crushing is dispersed in a liquid to form a slurry. The slurry may be delivered through a hydrocyclone, thereby separating the foreign material of different specific gravity. The hydrocyclone may also be used to classify particles of the same specific gravity but of different diameter (or other characteristic dimension). Alternatively, Dense Medium Separation (DMS) may be employed, wherein the slurry is formed using a dense liquid such as a suspension of particles of high specific gravity. The slurry may then be processed in a centrifugal separator. The liquid that is used as a medium to fluidize the solid particles in the slurry may also serve as a solvent that dissolves undesirable soluble foreign material, thereby washing such material from at least the exterior regions of the halloysite clay granules and fines. For environmental reasons, the preferred suspending liquid is an aqueous medium, e.g. water. However, the aqueous medium can be made acidic or basic in order to leach out trace inorganic impurities that are more soluble in a non-neutral aqueous medium. In one embodiment, the slurry is made basic with a concentration of 0.5 molar sodium hydroxide at 60 degrees centigrade for 8 hours, in order to dissolve any allophane (a natural amorphous precursor to tubular halloysite). However, such a procedure may not be preferable, as there is a tradeoff in that such procedure may be detrimental to the halloysite tubules.

Following the step of initial purification, the slurry is either a) intermixed with the charged block copolymer of the present invention, dry or with solvent, or b) mixed with the neutral block copolymer of the present invention, dry or with solvent and then the pH of the reaction slurry can be adjusted. Afterwards, there is a step of final comminution to break the agglomerated halloysite clay granules and fines down into disassociated individual halloysite microtubules and platelets. There are many well known methods in mineral processing for further size reduction from granules on the order of 0.1 inch in diameter to particle sizes on the order of microns. This process is generally referred to in the mineral processing industry as grinding, and may be performed using equipment that either tumbles the mineral feedstock together with grinding media in a rotating vessel, or shears the material between two surfaces forced together and moving in opposite directions. As is the case for crushing equipment, there are many manufacturers of grinding apparatus capable of grinding mineral feedstock volumes on the order of many tons. Manufacturers also provide pilot plant and laboratory apparatus for the processing of material volumes of about ten pounds to about one ton. There are also many well known small scale ball mills and attritors for fine particle milling of pigments for the formulations of paints, photoconductive coatings, and the like. In one aspect the present invention provides a method for making a modified halloysite clay, comprising: mining raw halloysite clay; crushing the raw halloysite clay to form a crushed raw halloysite clay; adding water to the crushed raw halloysite clay; recovering a halloysite slurry; adding a block copolymer to the halloysite clay slurry, the block copolymer having a composition that includes a first block, the first block comprising monomeric units of a functionalized acrylic monomer and/or a functionalized vinyl monomer and monomeric units of a vinyl monomer, and a second block, the second block comprising monomeric units of one or more vinyl monomers and monomeric units of the functionalized acrylic monomer and/or the functionalized vinyl monomer from the first block; and recovering a modified halloysite clay. Preferably, the modified halloysite clay contains less than about 10% wt of the block copolymer. The method for making a modified halloysite clay preferably further includes modifying the pH of the mixture of halloysite slurry and block copolymer in order to either protonate or deprotonate at least one monomer in the block copolymer. Preferably, the method for making a modified halloysite clay further includes mixing the modified halloysite clay with a functional polyolefin to form a polyolefin masterbatch, which preferably further includes mixing the polyolefin masterbatch with a thermoplastic polymer matrix and recovering an inorganic tubule-polymer composite material.

In another embodiment an inorganic tubule slurry obtained prior to the last centrifugation or evaporation step of the isolation and purification procedure is either a) intermixed with the charged block copolymer of the present invention dry or with solvent and the reaction slurry may again be subjected to stirring or b) mixed with the neutral block copolymer of the present invention, dry or with solvent, and then the pH of the reaction slurry can be adjusted. In a more specific embodiment pH is adjusted using sodium tripolyphosphate between 0.25 and 5% wt. In a more specific embodiment the pH is between 6 and 10.

One embodiment of the block copolymer is a block copolymer with a composition that includes a first block, which comprises monomeric units of a functionalized acrylic and/or functionalized vinyl monomer and monomeric units of a vinyl monomer, and a second block, which comprises monomeric units of one or more vinyl monomers and monomeric units of the functionalized acrylic and/or functionalized vinyl monomer from the first block, and the functionalized acrylic and/or functionalized vinyl monomer is cationic or upon pH change can be positively charged.

Another embodiment of the block copolymer is a block copolymer with a composition that includes a first block, which comprises monomeric units of a functionalized acrylic and/or functionalized vinyl monomer and monomeric units of a vinyl monomer, and a second block, which comprises monomeric units of one or more vinyl monomers and monomeric units of the functionalized acrylic and/or functionalized vinyl monomer from the first block, and the functionalized acrylic and/or functionalized vinyl monomer is anionic or upon pH change can be negatively charged.

Another embodiment block copolymer has a composition that includes a first block, which comprises monomeric units having a negative charge, or monomers that upon pH change become negatively charged, and a second block, which comprises monomeric units of one or more vinyl monomers. Polymers can be synthesized following a procedure similar to the one disclosed in U.S. Patent Application Pub. No. 20060160940, but including monomers that bear a negative charge or that upon pH change can bear a negative charge, instead of using cationic monomers.

In another embodiment the pH of an inorganic tubule slurry obtained prior to the last centrifugation or evaporation step of the isolation and purification procedure is adjusted between 6 and 10 and then it is intermixed with either a) the dry charged block copolymer of the present invention and the reaction slurry may again be subjected to stirring or b) a solution of the charged block copolymer, prepared by previously dissolving the neutral block copolymer in water and adding an acid or base in order to obtain a positive or a negative charge on the block copolymer, and the reaction slurry may again be subjected to stirring.

In a more specific embodiment, the temperature of this process step is between 20° C. and 90° C., preferably between 30° C. and 80° C. and most preferably between 30° C. and 70° C.

In a preferred embodiment the block copolymer functional acrylic or functional vinyl monomers are monomers that can be polymerized using controlled radical polymerization containing positively charged monomers or monomers that upon pH change become positively charged. Examples of functional groups contained in functional acrylic or functional vinyl monomers include ammonium, alkyl ammonium, aryl ammonium (—N+R(3−n−m)ArmHn where (n+m)≤3), aryl and alkyl phosphonium (—P+R(3−n−m)ArmHn where (n+m)≤3), aryl and alkyl sulfonium (—S+R(2−n−m)ArmHn where (n+m)≤2), substituted ammonium, (—N+X1X2×3) phosphonium (—P+X1X2×3), or sulfonium (—S+X1×2), wherein X1, X2 and X3 are each individually H or a C1-C20 group selected from alkyl, aryl, perfluoroalkyl, arylalkyl, alkylaryl and any of these substituted with one or more oxygen, nitrogen, chlorine, fluorine, bromine, iodine, sulfur and phosphorous. The term "alkyl" refers to linear or branched saturated hydrocarbon substituents having from one to about twenty carbon atoms, or preferably, one to about twelve carbon atoms. Alkyl substituents may themselves be substituted with one or more substituents such as alkoxy, hydroxyl, amino, halo, nitro, acyl, cyano, carboxy, and thioalkyl, for example. The term "aryl" refers to a carbocyclic aromatic system containing one or more rings which may be attached together in a pendant manner or may be fused, such as phenyl, naphtyl, indane. Aryl substituents may also be substituted with one or more substituents such as alkyl, haloalkyl, alkoxy, hydroxyl, amino, halo, nitro, alkylamino, acyl, cyano, carboxy, thioalkyl, and alkoxycarbonyl. Other quaternary ammonium moieties include, but are not limited to, imidazolium, triazolium and substituted derivatives thereof. Substitution of the imidazolium or triazolium group may be with any of a variety of alkyl, aryl, arylakyl or alkylaryl groups, and-or substitution may be in the form of one or more fused rings. Other phosphonium groups include 1 to 4 aryl substituents.

In a preferred embodiment the block copolymer contains monomers that can be polymerized using controlled radical polymerization containing negatively charged monomers or monomers that upon pH change to become negatively charged. The examples of monomers include, but are not limited to, monomers possessing Lewis acids, Bronsted acids such as carboxyl, sulphate, sulphonate, sulfonic acid, carboxylic acids, hydroxyl, mercapto or thio, and any acid hydrogen such as alfa carboxyl hydrogens. In one embodiment the second block of the block copolymer comprises vinyl monomers which also bear functional groups. Non-limiting examples of functional groups are acid, hydroxyl, epoxy, and amino.

The hydrophilic block copolymer of the present invention can be synthesized as described in the parent patent document, using one of the controlled radical polymerization techniques. In a preferred embodiment of the present invention, the hydrophilic block copolymers are synthesized using a Reversible Addition-Fragmentation Transfer (RAFT) reaction, comprising reacting an acrylic monomer having functional groups and one or more vinyl monomers in the presence of a free radical initiator and a RAFT agent in a first step to form a reaction product, wherein the reaction product includes residual unreacted acrylic monomer; and reacting in a second step one or more vinyl monomers with the reaction product from the first step to form a second block, wherein the second block incorporates the residual unreacted acrylic monomer. In a more specific embodiment the RAFT agent used to synthesize the hydrophilic block copolymers is dibenzyl trithiocarbonate. In the present invention the first block can include not only acrylic monomer that has functional groups but also, more generally, vinyl monomer that has functional groups. The first block can have one or the other or both of acrylic monomer or vinyl monomer, each with functional groups. It is appreciated that an acrylic monomer is a vinyl monomer, but both terms are used for the sake of clarity.

Polymers can also be synthesized following a procedure similar to the one disclosed in U.S. Patent Application Pub. No. 20060160940, but including monomers that bear a negative charge or that upon pH change can bear a negative charge, instead of using cationic monomers.

The inorganic tubules include natural occurring clays such as imogolite, cylindrite, boulangerite, halloysite, synthetic tubular clays and mixtures thereof. Inorganic tubules are also known as microtubules, microtubes, nanotubules or nanotubes.

The slurry of inorganic tubules can be previously treated into the inner surface of the lumen of a mineral microstructure. Examples of such molecules and/or modification are described above.

One procedure to modify the inorganic tubules include two steps: 1) the addition of the neutral block copolymer to the inorganic tubules dispersed in a dispersion medium, and 2) modification of the pH.

In one embodiment the first and the second steps are carried out with stirring. Stirring speeds are between 10 and 1000 rpm, preferably between 100 and 800 rpm. In a specific embodiment other cationic species can be added in step 1. In another specific embodiment, the neutral block copolymer of the first step is suspended, dissolved or dispersed in a dispersion medium before adding it to the inorganic tubules In this procedure, the block copolymer functional acrylic or vinyl monomers are added in their neutral form, for example, amines. After the block copolymer is added to the clay mineral dispersed in a dispersion medium, the pH is modified.

In a specific embodiment pH is between 1 and 3, in order to protonate the functional groups and obtain cationic species. In the case of amines, a change to low pH produces ammonium ions. The pH can be modified using any acid that is soluble in the dispersion medium and that has a pKa adequate for lowering the pH enough to protonate the block copolymer functional groups. A strong mineral acid can be used, such as hydrochloric acid.

Another procedure to modify the inorganic tubules comprises the addition of a charged block copolymer dry or with solvent to the inorganic tubules dispersed in a dispersion medium. In one embodiment the charged block copolymer is added to the inorganic tubule with stirring. Stirring speeds are between 10 and 1000 rpm, preferably between 100 and 800 rpm. In a more specific embodiment the inorganic tubules are dispersed in a dispersion medium where the pH of the medium is between 6 and 10.

The charged block copolymer can be obtained by protonating a solution or suspension of the neutral block copolymer in a dispersion medium. The block copolymer can be protonated by lowering the pH of the dispersion medium, using an acid molecule. The acid is preferably a strong mineral acid. The charged block copolymer can be either isolated from the dispersion medium by evaporating the dispersion medium or used directly to modify the clay mineral dispersed in a dispersion medium.

The charged block copolymer can be obtained by deprotonating a solution or suspension of the neutral block copolymer in a dispersion medium. The block copolymer can be deprotonated by lowering the pH of the dispersion medium, using a basic molecule. The base is preferably a strong base. The charged block copolymer can be either isolated from the dispersion medium by evaporating the dispersion medium or used directly to modify the clay mineral dispersed in a dispersion medium.

The preferred dispersion medium is one that disperses the clay mineral uniformly and exhibits good miscibility with the block copolymer. Examples of the dispersion medium include water, methanol, ethanol, propanol, isopropanol, ethyleneglycol, 1,4-butanediol, glycerin, dimethyl sulfoxide, N,N-dimethylformamide, acetic aci, formic acid, pyridine, aniline, phenol, nitrobenzene, acetonitrile, acetone, methyl ethyl ketone, chloroform, carbon disulfide, propylene carbonate, 2-methoxyethanol, ether, carbon tetrachloride, and n-hexane, alone or in combination with one another.

Additional cationic species are inorganic or organic cations such as substituted ammonium ions, e.g., octadecyl dimethyl ammonium ion or dodecylammonium ion or other mono or di C8-C18 alkylammonium ion or where substitution is by —R—COOH wherein R denotes an alkylene group which contain phenylene, vinylene, branching and or other linkages, e.g., 12-aminododecanoic acid ion, or organophosphonium ions, e.g., C8-C18 alkylphosphonium ion or organosulfonium ions, e.g., C8-C18 alkylsulflnium ions. Inorganic cations can also be incorporated as additional cationic species. Examples of inorganic cations include, but are not limited to, $Ti(OC_3H_7)_4$, $Zr(OC_3H_7)_4$, $PO(OCH_3)_3$, $PO(OC_2H_3)_3$, $B(OCH_3)_3$, $B(OC_2H_5)_3$. Considering the total amount of positive charges provided by the cationic species and the block copolymer as 100%, at least about 50% of the positive charges are provided by the block copolymer, preferably at least about 70% of the positive charges are provided by the block copolymer and more preferably, at least about 80% of the positive charges are provided by the block copolymer.

After the inorganic tubules have been treated with the block copolymer of the present invention, the material can be either directly used or it may also be used after the dispersion medium has been completely or partially removed by methods known in the art including, but not limited to filtration, vacuum filtration, centrifugal separation, decantation, evaporation and their combinations.

The inorganic tubules modified by the block copolymer can be treated in a second step into the inner surface of the lumen of the mineral microstructure. Examples of such molecules and/or modification are described above.

The inorganic tubules modified by the block copolymer can be directly mixed with a molten thermoplastic polymer to form polymer composites. Alternatively, the tubules modified by the block copolymer can be mixed with one or more monomers, one or more components that can polymerize to render a thermoset matrix and optionally one or more solvents to form polymer composites. Alternatively, the tubules modified by the block copolymer can be mixed with one or more monomers and one or more components can be further polymerized to form thermosets or thermoplastic oligomers or polymers.

Examples of thermoplastic polymers include, but are not restricted to, hydrogenated or partially hydrogenated homopolymers, and random, tapered, or block polymers (co-polymers, including terpolymers, tetrapolymers, etc.) of conjugated dienes and/or monovinyl aromatic compounds. The conjugated dienes include isoprene, butadiene, 2,3-dimethylbutadiene and/or mixtures thereof. The monovinyl aromatic compounds include any of the following and mixtures thereof: monovinyl monoaromatic compounds, such as styrene or alkylated styrenes substituted at the alpha-carbon atoms of the styrene, such as alpha-methylstyrene, or at ring carbons, such as o-, m-, p-methylstyrene, ethylstyrene, propylstyrene, isopropylstyrene, butylstyrene, isobutylstyrene, tert-butylstyrene (e.g., p-tertbutylstyrene). Also included are vinylxylenes, methylethyl styrenes, and ethylvinylstyrenes. Specific examples include random polymers of butadiene and/or isoprene and polymers of isoprene and/or butadiene and styrene, acrylonitrile-styrene-butadiene copolymers, and also estero-specific polymers such as syndiotactic polystyrene.

Typical thermoplastic block copolymers include polystyrene-polyisoprene, polystyrene-polybutadiene, polystyrene-polybutadiene-polystyrene, polystyrene-ethylene butylene-polystyrene, polyvinyl cyclohexane-hydrogenated polyisoprene, and polyvinyl cyclohexane-hydrogenated polybutadiene. Tapered polymers include those of the previous monomers prepared by methods known in the art. Other non-styrenic polymers miscible or compatible with the second block of the copolymer include, but are not limited to, polyphenylene ether (PPE), polyvinyl methyl ether and tetramethyl polycarbonate, methyl methacrylate, alkyl substituted acrylates, alkyl substituted methacrylates and their copolymers with styrene, vinyl chloride, and vinylidene chloride. It also comprises polyolefins, where the term polyolefin is defined as a polymer the majority of whose monomers are olefins and may be polyethylene, polypropylene or copolymers of ethylene and either propylene or vinyl acetate. It also comprises engineering thermoplastic such as aliphatic and aromatic polycarbonates (such as bisphenol A polycarbonate), polyesters (such as poly(butylene terephthalate) and poly(ethylene terephthalate)), polyamides (e.g., nylons, such as nylon-6 (polycarpolactam), nylon-66 (polyhexamethylene adipamide)), nylon-11, nylon-12, nyon-46, nylon-7 or nylon-8), polyimides, polyacetal, polyphenylene ether or mixtures thereof polyamides, polyphenylene sulfides, polysulfones, polyether sulfones, vinylidene polymers (e.g., poly(vinylidene fluoride) and poly(vinlidenechloride)), fluoropolymers (e.g., polytetrafluoroethylene and polychlorotrifluoroethylene), polysiloxanes (e.g., polydimethylsiloxanes). All these engineering thermoplastics are prepared according to well known commercial processes. Reference to such processes can be found in technical publications such as Encyclopedia of Polymer Science and Engineering, John Wiley and Sons, 1988, under the respective engineering thermoplastic polymer topic heading.

Examples of thermoset matrices include, but are not restricted to, isophthalic resins, epoxy resins, unsaturated polyester, epoxy-polyester resins, therephthalic resins, polyurethane resins, polyesters, epoxy/polyester hybrids, melamine, silicones, acrylic polymers, urethanes, phenolic resins, polyamide resins, alkyd resins, furan resins, urea resins, aniline resins. Polymerization of components that can polymerize to render a thermoset matrix is carried out in various ways depending on the type of monomer selected. In addition, this step permits the use of various solvents, catalysts and accelerators for polymerization.

Examples of monomers that can polymerize to render thermoplastic matrices include monomers of ethylene, propylene, butadiene, vinyl chloride, vinylidene chloride, styrene, acrylic acid, methacrylic acid, t-butylacrylamide, acrylonitrile, norbornadiene, N-vinylcarbazole, vinylpyridine, N-vinyl-2-pyrrolidone, 1-butene, isobutene, vinylidene, cyanide, 4-methylpentene-1, vinyl acetate, vinylisobutyl ether, methyl vinyl ketone, phenyl vinyl ketone, phenyl vinyl sulfide and acrolein. Examples of the monomer of fluoroethylene resin include tetrafluoroethylene and chlorotrifluoroethylene.

Polymerization of monomers is carried out in various ways depending on the type of monomer selected. In addition, this step permits the use of various solvents, catalysts and accelerators for polymerization. Monomers may or may not react with the second block of the block copolymer depending on the composition of the second block and on the presence of additional functional monomers in the second block.

Thermoset/inorganic tubules composites and thermoplastic/inorganic tubules composites can each include optionally additional additives, additional fillers and combinations thereof. Fillers include, but are not limited to, metal oxides such as iron and nickel oxide, nonmetals such as carbon fiber, silicates, aluminosilicates, titanium dioxide, glass flakes, glass beads, glass fibers, polymer fibers, other tubular or fibrous clays, inorganic clays, organic clays, carbon black, carbon nanotubes, nanofillers, talc, mica and combinations thereof. Additives include, but are not limited to, stabilizers, flame retardants, anti-oxidants, processing aids, lubricants, dispersing agents, viscosity reducers, pigments and combinations thereof. Additives and fillers are used in normal and conventional amounts, dependent upon the desired end-use. Thermoplastic/inorganic tubules composites can be vulcanized in a second step.

The composite material prepared using one of the above mentioned procedures is composed of a polymer and inorganic tubules uniformly dispersed in the polymer. The content of the inorganic tubules in the polymer should preferably be 0.01% wt to 45% wt. More preferably the content of the inorganic tubules in the polymer should preferably be 0.1% wt to 30% wt and most preferably between 1% wt and 25% wt.

The amount of block copolymer used to modify the inorganic tubules in one of the above mentioned procedures should be adjusted in order to maximize the interaction between the inorganic tubule and the polymer, but to avoid agglomeration of the inorganic tubules by excessive addition of block copolymer. Specially, when the inorganic tubules are pre-treated with amphiphilic block copolymers, an excessive amount of block copolymer can induce agglomeration of the inorganic tubules, and in some cases, the agglomerated tubules will not disperse properly in the polymeric matrix. Since the optimal amount of block copolymer depends on the block copolymer composition and on the polymer matrix composition, it is recommended to start with a low amount of block copolymer and gradually increase it in order to obtain an optimal performance.

In one embodiment the functional vinyl or acrylic monomer in the block copolymer is selected from the group consisting of N,N'-dialkylaminoalkyl methacrylate, N,N'-diarylaminoalkyl methacrylate, N,N'-dialkylaminoalkyl acrylate, and N,N'-diarylaminoalkyl acrylate.

The thermoplastic nanocomposite compositions according to the present invention are in some cases vulcanizable materials from which molded articles of manufacture having valuable properties can be produced by conventional shaping processes, such as melt spinning, casting, vacuum molding, sheet molding, injection molding and extruding. Examples of such molded articles are components for technical equipment, apparatus castings, household equipment, sports equipment, bottles, containers, components for the electrical and electronics industries, car components, circuits, fibers, semi-finished products that can be shaped by machining and the like. The use of the materials for coating articles by means of powder coating processes is also possible, as is their use as hot-melt adhesives. The molding compositions according to the invention are outstandingly suitable for specific applications of all types since their spectrum of properties can be modified in the desired direction in manifold ways. Such molded products of this invention will derive one or more advantages over products molded with polymers having no dispersed inorganic tubules, including increased modulus, stiffness, wet strength, dimensional stability, and heat deflection temperature, and decreased moisture absorption, flammability, permeability, and molding cycle time.

Applications of inorganic tubule-polymer composites include those mentioned in the prior art, with improved performance in the polymer composites, which is due to the addition of the block copolymer of the present invention.

EXAMPLES

Synthesis of Block Copolymers for Inorganic Tubules Modification

Reagents: Dibenzoyl peroxide (BPO) and 2,5-Dimethyl-2, 5-di(tert-butylperoxy)hexane (Trigonox 101) were acquired from Akzo Nobel; Styrene (St) was acquired from Quimir; 2-(dimethylamino)ethyl methacrylate (DMAEMA) was acquired from Degussa and Dibenzyl trithiocarbonate (DBTTC) was acquired from Arkema. Reagents were used as received.

Examples 1 and 2

Preparation of Poly(styrene-co-2-dimethylaminoethylmethacrylate)-block-(styrene-co-2-dimethylaminoethylmethacrylate) and 4-tert-butylstyrene-co-2-dimethylaminoethyl methacrylate)-block-(4-tert-butylstyrene-co-2-dimethylaminoethyl methacrylate).

General Synthetic Procedure: Monomers, DBTTC and initiators were placed in a double jacket glass reactor and oxygen was removed with nitrogen bubbling for 3 min. Preheated oil (130° C.) was circulated through the outside jacket and stirring was started (300 rpm). After the desired conversion was reached, heating was suspended and additional St was added to the reactor with stirring. After 3 min. of stirring, the reaction was either continued in the glass reactor until 10-20% more conversion was reached or directly poured into a second reactor. Nitrogen was bubbled and the reactor was immersed in an oil bath previously heated to 120-125° C. for 16 hrs to reach the desired conversion. The remaining monomer was removed by devolatilization. Table 1 provides the amount of reagent used in each example.

Molecular weight distributions relative to polystyrene were determined through GPC (ASTM D3536-91) using a Waters 410, RI detector, THF eluent, 1.0 mL/min, at 40° C.; Styragel columns HR 4 and HR 3. Results are shown in table 2.

TABLE 1

Block copolymers composition.

| Block copolymer | FIRST STEP | | | | | | | SECOND STEP | | |
|---|---|---|---|---|---|---|---|---|---|---|
| Example number | St (mmol) | DMAEMA (mmol) | TBS (mmol) | DBTTC (mmol) | BPO (mmol) | Trigonox 101 (mmol) | Conversion (%) | St (second block) (mmol) | TBS (second block) (mmol) | Total Conversion (%) |
| 1 | 605.0 | 235.5 | | 12.60 | 1.29 | 0.34 | 69.62 | 240 | | 91.44 |
| 2 | | 241.6 | 387.0 | 16.90 | 1.75 | 0.52 | 77.10 | | 156 | 92.68 |

TABLE 2

Properties of block copolymers.

| Block copolymer | FIRST STEP | | | TOTAL | | |
|---|---|---|---|---|---|---|
| Example number | Mn | Mw | PDI | Mn tot | Mw | PDI |
| 1 | 2712 | 4053 | 1.49 | 6039 | 8994 | 1.49 |
| 2 | 4076 | 5230 | 1.28 | 4926 | 6573 | 1.33 |

Preparation of Inorganic Tubules—Polymer Composites using Inorganic Tubules Modified with Block Copolymers.

A. Inorganic Tubules Modification using Block Copolymers

Reagents: Sodium tripolyphosphate was acquired from Quimir; halloysite was acquired from NanoClay and Technologies Inc. (a division of the Atlas Mining Co.); polypropylene homopolymer was acquired from Valtech (HS013).

Example 3

252 g of a solution of 1% of sodium tripolyphosphate in water and 50.44 g of halloysite were mixed at 8,000 rpm and 60° C. for 15 minutes. Block copolymer from example 1, previously dissolved in water (0.1513 g of block copolymer in 20 g of water at 90° C., pH=1) was added to the mixture (final mixture pH is 6). The mixture was stirred at 300 rpm for 1 hour at 60° C. The block copolymer modified clay suspension was then filtered and the solid was dried at 25° C. for 24 hours. The dry material was ground to obtain a fine powder (5-10 µm).

Example 4

250 g of solution of 1% of sodium tripolyphosphate in water and 35 g of halloysite were mixed at 8 000 rpm and 60° C. for 15 minutes. Block copolymer from example 2, previously dissolved in water (0.15 g of block copolymer in 20 g of water at 90° C., pH=1) was added to the mixture (final mixture pH is 6). The mixture was stirred at 300 rpm for 1 hour at 60° C. The block copolymer modified halloysite suspension was then filtered and the solid was dried at 25° C. for 24 hours. The dry material was ground to obtain a fine powder (5-10 µm).

B. Preparation of Polypropylene—Inorganic Tubules Composite.

Example 5

43.31 g of polypropylene and 1.69 g of clay of example 4 were mixed using a Brabender Mixer at 80 rpm and 200° C. for 7 minutes. The blend was cooled and mechanical properties were analyzed.

Example 6

Reference without block copolymer. 43.65 g of polypropylene and 1.35 g of halloysite were mixed using a Brabender Mixer at 80 rpm and 200° C. for 7 minutes. The blend was cooled and mechanical properties were analyzed.

Tension test specimens were injected in a micro injected Atlas Polymer Mod LMM120 from Alpha Technologies, according to the ASTM D638M-93, Standard Test Method for Tensile Properties of Plastics (Metric, TYPE M-III, FIG. 1 of the standard test method). Results are shown in Table 3. Samples from example 5 and 6 were analyzed using a Carl Zeiss EM910 120 kV transmission electron microscope after microtoming at 0° C.

TABLE 3

Mechanical properties of blends. Examples 5-6.

| Example number | Yield stress (Psi) | Elastic modulus (Psi) | Yield stress increase[a] | Elastic modulus increase[a] |
|---|---|---|---|---|
| 5 | 4,413 | 123,308 | 14.6% | 71.8% |
| 6 | 4,166 | 109,052 | 8.22% | 51.92% |

[a]The increase is calculated, considering neat polypropylene as the reference material. The yield stress of neat polypropylene is 3850 psi and the modulus of neat polypropylene is 71,780 psi. Property increase = 100*((value of sample/value of neat polypropylene)-1)

Table 3 illustrates the use of block copolymers to improve mechanical properties of polypropylene/inorganic tubule composites. The modulus obtained just by adding 3% of halloysite previously treated with only 0.43% of block copolymer is increased in 71.8%, compared with propylene blended with halloysite without block copolymer which increases modulus in 51.92%. The Yield stress increase is of 14.6%, compared to the yield stress increase obtained by adding untreated halloysite which is of 8.22%.

Thermoset Polymers—Inorganic Tubules Composites.

Example 7

100 g of a commercially available formulated resin for pultrusion (for example isophthalic polyester resin) and 5 g of modified inorganic tubule from example 3 were physically mixed in a homogenizer to produce 160 g of a mixture. The mixture was then mixed using a Cowless Homogenizer at 2000 rpm and 40° C. for 15 minutes. The resin was poured onto a bed of fiber-glass with (40% wt of resin and 60% wt fiber), and then heated to 120° C. for 60 minutes to cure it. The material was evaluated in an Instron universal machine.

Example 8

100 g of a commercially available formulated resin for pultrusion (for example isophthalic polyester resin) and 5 g of modified inorganic tubule from example 3 were physically mixed in a homogenizer to produce 160 g of a mixture. The mixture was then mixed using a Cowless Homogenizer at 2000 rpm and 40° C. for 15 minutes. The resin was heated to 120° C. for 60 minutes to cure it. The material was evaluated in an Instron universal machine.

Example 9

Reference material with fiber-glass. 100 g of a commercially available formulated resin for pultrusion (for example isophthalic polyester resin) was poured onto a bed of fiber-glass with (40% wt of resin and 60% wt fiber), and then heated to 120° C. for 60 minutes to cure it. The material was evaluated in an Instron universal machine. An E Modulus of 3700 MPa and a Tensile Strength of 43 MPa were obtained.

Example 10

Reference material without fiber-glass. 100 g of a commercially available formulated resin for pultrusion (for example isophthalic polyester resin) was heated to 120° C. for 60 minutes in order to cure it. The material was evaluated in a universal machine Instron. An E Modulus of 1400 MPa and a Tensile Strength of 11 MPa were obtained.

Example 11

Reference material with fiber-glass and without block copolymer. 100 g of a commercially available formulated resin for pultrusion (for example isoptalic polyester resin) and 5 g of non-modified inorganic tubule were physically mixed in a homogenizer to produce 160 g of a mixture. The mixture was then mixed using a Cowless Homogenizer at 2000 rpm and 40° C. for 15 minutes. The resin was poured onto a bed of fiber-glass with (40% wt of resin and 60% wt fiber) and then heated to 120° C. for 60 minutes in order to cure it. The material was evaluated in a universal machine Instron, where a value of E Module of 1100 MPa and a value of Tensile Strength of 7 MPa were obtained.

Example 12

Reference material without fiber-glass and without block copolymer. 100 g of a commercially available formulated resin for pultrusion (for example isophthalic polyester resin) and 5 g of non-modified inorganic tubule were physically mixed in a homogenizer to produce 160 g of a mixture. The mixture was then mixed using a Cowless Homogenizer at 2000 rpm and 40° C. for 15 minutes. The resin was heated to 120° C. for 60 minutes to cure it. The material was evaluated in a universal machine Instron, where a value of E Module of 1000 MPa and a value of Tensile Strength of 10 MPa were obtained.

Tension test specimens were cut from the film prepared, according to the ASTM D638M-93, Standard Test Method for Tensile Properties of Plastics (Metric, TYPE M-III, FIG. 1 of the standard test method). Results are shown in Table 4. Flexural mechanical properties were measured according to ASTM D-7091 and are shown in Table 5.

TABLE 4

Mechanical properties of thermoset resin - inorganic tubules composites. Examples 7-12.

| Example number | Elastic modulus (MPa) | Tensile strength at break (MPa) | Yield stress (MPa) | E Modulus/E Modulus of equivalent sample with halloysite and no diblock copolymer |
|---|---|---|---|---|
| 7 | 8080 | 138 | 92 | 7.3 |
| 8 | 3200 | 25 | 19 | 3.2 |
| 9 | 3700 | 43 | 37 | 3.4 |
| 10 | 1400 | 11 | 9 | 1.4 |
| 11 | 1100 | 7 | 4 | — |
| 12 | 1000 | 10 | 9 | — |

TABLE 5

Flexural mechanical properties.

| Example number | Flexural Modulus [MPa] |
|---|---|
| 7 | 2273 |
| 8 | 1530 |
| 9 | 1485 |
| 10 | 1222 |

Table 4 illustrates the mechanical properties of different thermoset resins. Examples 9 and 10 show the performance of a thermoset resin without adding halloysite, in one case using fiber glass (example 9) and in the other without using fiber glass (example 10). The use of 60% wt of fiber glass, which is a typical filler used to increase modulus of this type of resin, yields an increase of 164% in the modulus (from 1400 MPa of example 10 to 3700 MPa of example 9), of 291% in the tensile strength at break and of 311% in the yield stress. Adding 5% pphr of untreated halloysite decreases the mechanical properties of the thermoset resin, contrary to the expected results, considering the prior art. The addition of resin formulated with halloysite, even in combination with 60% of fiber glass (example 11) decreases the modulus, the tensile strength at break and the yield stress compared to the neat resin without fiber glass (example 10). Judging from these results, halloysite is a filler that decreases the mechanical properties of thermoset resins, including thermoset resins with traditional fillers such as fiber glass. If the halloysite tubules are previously treated with only 0.3% wt block copolymer using a very simple and fast procedure, described in example 3, which can easily be incorporated in the production process of inorganic tubules, we can obtain impressive mechanical properties increases. Example 8 is the thermoset resin with 5% pphr of halloysite previously treated with the block copolymers of the present invention. The modulus increase comparing it with the neat resin of example 10 is 128%, the tensile strength increase is 127% and the yield stress increased 111%. The results are remarkable even comparing them with the resin containing 60% wt of glass fiber (example 9), because the modulus difference is of only −13.51%, but in this case the amount of filler is of only 5% pphr and the weight increase in the resin is minimal, which is a huge advantage in terms of fuel economy during products transportation and in the final application. If treated halloysite is combined with fiber glass (example 7), we observe a synergic effect in which the modulus increase is of 477%. It is a synergic effect because the modulus difference between example 9 and 10 is of 2300 MPa, and the modulus difference between example 8 and 10 is of 1800 MPa, which, if combined would yield a theoretical modulus of 1400+2300+1800=5500 MPa, instead of the obtained result of 8080 MPa (47% more). In the case of the tensile strength at break, we also found an increase from 11 to 25 MPa and a synergic effect when fiber glass is also added; in this case the difference between the theoretical tensile strength at break increase (considering the increases obtained when halloysite is adder and when fiber glass is added) and the experimental one is of 138 MPa vs. 57 MPa (142% more). The yield stress also shows a synergic effect of 92 MPa experimental vs. 47 MPa theoretical (96% more).

In order to complement the mechanical properties characterization of thermoset resins containing halloysite previously treated with block copolymers, the flexural modulus was also measured (Table 5). Similar to the results obtained in the elastic modulus, the addition of halloysite previously treated with block copolymers has a synergistic effect on the flexural modulus. Example 8 shows an increase of 308 MPa compared to the resin without fiber glass and without treated halloysite, while example 9 shows an increase of 263 MPa when fiber glass is added to the thermoset resin. Adding both we would expect an increase of 1793 MPa combining treated halloysite and fiber glass, which is inferior to the measured flexural modulus of example 7, which combines fiber glass and treated halloysite and which has a value of 2273 MPa (26.77% more).

The complete contrast observed when untreated halloysite is added to the thermoset resin, which causes a detriment in mechanical properties, compared to the results obtained when the halloysite is pretreated with the block copolymers of the present invention, in which not only exceptional mechanical properties are observed but also synergistic effects are obtained when fillers such as fiber glass are used, exemplify the outstanding performance of block copolymers in increasing the interaction between halloysite and the polymeric matrix and also with additional fillers.

Having described the invention above, various modifications of the techniques, procedures, materials, and equipment will be apparent to those skilled in the art. It is intended that all such variations within the scope and spirit of the invention be included within the scope of the appended claims or within the scope of claims subsequently made to the invention.

What is claimed is:

1. A modified inorganic tubule composition, comprising:
a) inorganic tubules; and
b) a block copolymer added to the inorganic tubules for compatibilizing the inorganic tubules with a polymeric material, thereby making the modified inorganic tubule composition, the block copolymer having a composition comprising:
a first block comprising
  charged monomers or monomers that upon pH changes can become charged and
  monomeric units of a vinyl monomer; and
a second block comprising
  monomeric units of one or more vinyl monomers and
  monomeric units of the charged monomers or monomers that upon pH change can become charged from the first block,
wherein the amount of the block copolymer in the modified inorganic tubule composition is between about 0.001% and about 50% by weight,
wherein the amount of inorganic tubules in the modified inorganic tubule composition is at least about 50% by weight, and
wherein at least one block in the block copolymer tends to attach to and/or interact with the inorganic tubules and at least one other block in the block copolymer tends to attach to and/or interact with the polymeric material.

2. The modified inorganic tubule of claim 1, wherein the charged monomers or monomers that upon pH change can become charged monomers in the first block have a functional group selected from the group consisting of: ammonium; alkyl ammonium; aryl ammonium ($-N^+R_{(3-n-m)}Ar_mH_n$ where $(n+m)\leq 3$); aryl and alkyl phosphonium ($-P^+R_{(3-n-m)}Ar_mH_n$ where $(n+m)\leq 3$); aryl and alkyl sulfonium ($-S^+R_{(2-n-m)}A_{rm}H_n$ where $(n+m)\leq 2$); substituted ammonium ($-N^+X_1X_2X_3$); phosphonium ($-P^+X_1X_2X_3$); and sulfonium ($-S^+X_1X_2$), wherein R is an alkyl group, wherein Ar is an aryl group, wherein $X_1$, $X_2$ and $X_3$ are each individually H or a $C_1$-$C_{20}$ group, wherein said $C_1$-$C_{20}$ group is selected from the group consisting of alkyl, aryl, perfluoroalkyl, arylalkyl, and alkylaryl, and wherein one or more of the members of said group consisting of alkyl, aryl, perfluoroalkyl, arylalkyl or alkylaryl may be substituted with one or more substituents selected from the group consisting of oxygen, nitrogen, chlorine, fluorine, bromine, iodine, sulfur and phosphorous.

3. The modified inorganic tubule of claim 1, wherein the second block of the block copolymer comprises vinyl monomers with a functional group selected from the group consisting of acid, hydroxyl, epoxy and amino.

4. The modified inorganic tubule of claim 1, wherein the second block of the block copolymer is hydrophobic.

5. The modified inorganic tubule of claim 1, wherein the inorganic tubules are selected from the group consisting of: synthetic inorganic tubules, modified inorganic tubules and natural tubules selected from the group consisting of halloysite, cylindrite, boulangerite, imogolite, and mixtures thereof.

6. The inorganic tubule of claim 1, wherein the inorganic tubule has two or more overlapping layers with an interlayer space between the layers and a lumen, the lumen having an inner surface, and wherein the inorganic tubule contains one or more metals, inorganic, organic, organometallic or coordination compounds introduced either in the interlayer space or into the inner surface of the lumen.

7. The composition of claim 1, further comprising additional inorganic or organic cations or anions.

8. A modified inorganic tubule composition, comprising:
a) 50-99.999% wt of inorganic tubules; and
b) 0.001-50% wt of a block copolymer comprising:
  a first block comprising charged monomers or monomers that upon pH change can become charged and monomeric units of one or more vinyl monomers; and
  a second block comprising monomeric units of one or more vinyl monomers,
wherein the block copolymer modifies the inorganic tubules thereby making the modified inorganic tubule composition, and
wherein at least one block in the block copolymer tends to be compatible with the inorganic tubules and at least one other block in the block copolymer tends to be compatible with a polymeric material.

9. The modified inorganic tubule of claim 8, wherein the negatively charged monomers or monomers that upon pH change can become negatively charged monomers in the first block have functional groups selected from Lewis acids, Brönsted acids, sulphate, sulphonate, sulfonic acid, carboxylic acids, hydroxyl, anhydride, mercapto, thio, and acid hydrogens including, but not limited to, alfa carboxyl hydrogens and substituted derivatives thereof.

10. The modified inorganic tubule of claim 8, wherein the second block of the block copolymer comprises vinyl monomers with a functional group selected from the group consisting of acid, hydroxyl, epoxy and amino.

11. The modified inorganic tubule of claim 8, wherein the second block of the block copolymer is hydrophobic.

12. The modified inorganic tubule of claim 8, wherein the inorganic tubule is a synthetic inorganic tubule, a modified inorganic tubule and/or a natural tubule selected from the group consisting of halloysite, cylindrite, boulangerite, and imogolite.

13. The inorganic tubule of claim 8, wherein the inorganic tubule has two or more overlapping layers with an interlayer space between the layers and a lumen, the lumen having an inner surface, and wherein the inorganic tubule contains one or more metals, inorganic, organic, organometallic or coordination compounds introduced either in the interlayer space or into the inner surface of the lumen.

14. A process for producing the modified inorganic tubule composition of claim 1, comprising the steps of:
 a) dispersing the inorganic tubules in a dispersion medium; and
 b) adding the block copolymer.

15. The process of claim 14, wherein the block copolymer is dispersed in the same or a different dispersion medium.

16. The process of claim 14, further comprising adjusting the pH of the inorganic tubule-block copolymer mixture.

17. The process of claim 14, further comprising isolating the modified inorganic tubules.

18. The process of claim 14, wherein the dispersion medium is selected from the group consisting of water, methanol, ethanol, propanol, isopropanol, ethyleneglycol, 1,4-butanediol, glycerin, dimethyl sulfoxide, N,N-dimethylformamide, acetic acid, formic acid, pyridine, aniline, phenol, nitrobenzene, acetonitrile, acetone, methyl ethyl ketone, chloroform, carbon disulfide, propylene carbonate, 2-methoxyethanol, ether, carbon tetrachloride, n-hexane, and combinations thereof.

19. A process for producing the modified inorganic tubule composition of claim 8, comprising the steps of:
 a) dispersing the inorganic tubules in a dispersion medium; and
 b) adding the block copolymer.

20. The process of claim 19, wherein the block copolymer is dispersed in the same or a different dispersion medium.

21. The process of claim 19, further comprising adjusting the pH of the inorganic tubule-block copolymer mixture.

22. The process of claim 19, further comprising isolating the modified inorganic tubules.

23. The process of claim 19, wherein the dispersion medium is selected from the group consisting of water, methanol, ethanol, propanol, isopropanol, ethyleneglycol, 1,4-butanediol, glycerin, dimethyl sulfoxide, N,N-dimethylformamide, acetic acid, formic acid, pyridine, aniline, phenol, nitrobenzene, acetonitrile, acetone, methyl ethyl ketone, chloroform, carbon disulfide, propylene caronate, 2-methoxyethanol, ether, carbon tetrachloride, n-hexane, and combinations thereof.

24. A composition for an inorganic tubule-polymer composite material, comprising:
 a) the modified inorganic tubules of claim 1; and
 b) a polymer matrix.

25. The composition of claim 24, wherein the polymer matrix comprises a thermoplastic polymer.

26. The composition of claim 24, wherein the polymer matrix comprises a thermoset polymer.

27. The composition of claim 24, further comprising fillers, additives and/or compatibilizers.

28. The composition of claim 27, wherein fiber glass is added as a filler at between about 5% wt to about 80% wt.

29. A composition for an inorganic tubule-polymer composite material, comprising:
 a) the modified inorganic tubules of claim 8; and
 b) a polymer matrix.

30. The composition of claim 29, wherein the polymer matrix comprises a thermoplastic polymer.

31. The composition of claim 29, wherein the polymer matrix comprises a thermoset polymer.

32. The composition of claim 29, further comprising fillers, additives and/or compatibilizers.

33. The composition of claim 32, wherein fiber glass is added as a filler at between about 5% wt to about 80% wt.

34. The composition of claim 1, wherein the modified inorganic tubule composition contains less than about 10% wt of the block copolymer, and wherein the inorganic tubules are halloysite.

35. The composition of claim 1, wherein the charged monomers or monomers that upon pH change can become charged are selected from the group consisting of N,N'-dialkylaminoalkyl methacrylate, N,N'-diarylaminoalkyl methacrylate, N,N'-dialkylaminoalkyl acrylate, and N,N'-diarylaminoalkyl acrylate.

36. The composition of claim 8, wherein the charged monomers or monomers that upon pH change can become charged are selected from the group consisting of N,N'-dialkylaminoalkyl methacrylate, N,N'-diarylaminoalkyl methacrylate, N,N'-dialkylaminoalkyl acrylate, and N,N'-diarylaminoalkyl acrylate.

37. The composition of claim 1, wherein the charged monomers or monomers that upon pH change can become charged comprise 2-dimethylaminoethyl methacrylate, and wherein the inorganic tubules are halloysite.

38. A process for producing the modified inorganic tubule composition of claim 6, comprising the steps of:
 a) dispersing inorganic tubules in a dispersion medium;
 b) adding a block copolymer, wherein the block copolymer comprises a first block comprising charged monomers or monomers that upon pH changes can become charged and monomeric units of a vinyl monomer; and a second block comprising monomeric units of one or more vinyl monomers and monomeric units of the charged monomers or monomers that upon pH change can become charged from the first block; and
 c) recovering the modified inorganic tubule composition of claim 6.

39. A process for producing the modified inorganic tubule composition of claim 13, comprising the steps of:
 a) dispersing inorganic tubules in a dispersion medium;
 b) adding a block copolymer, wherein the block copolymer comprises a first block comprising charged monomers or monomers that upon pH changes can become charged and monomeric units of a vinyl monomer; and a second block comprising monomeric units of one or more vinyl monomers and monomeric units of the charged monomers or monomers that upon pH change can become charged from the first block; and
 c) recovering the modified inorganic tubule composition of claim 13.

40. A composition for an inorganic tubule-polymer composite material, comprising:
 a) the modified inorganic tubules of claim 6; and
 b) a polymer matrix.

41. A composition for an inorganic tubule-polymer composite material, comprising:
 a) the modified inorganic tubules of claim 13; and
 b) a polymer matrix.

42. The modified inorganic tubule composition of claim 1, wherein the amount of the block copolymer in the modified inorganic tubule composition is at least about 0.04% and less than about 10% by weight.

43. The modified inorganic tubule composition of claim 1, wherein the amount of the block copolymer in the modified inorganic tubule composition is at least about 0.1% and less than about 10% by weight.

44. The modified inorganic tubule composition of claim 8, wherein the amount of the block copolymer in the modified inorganic tubule composition is at least about 0.04% and less than about 10% by weight.

45. The modified inorganic tubule composition of claim 8, wherein the amount of the block copolymer in the modified inorganic tubule composition is at least about 0.1% and less than about 10% by weight.

46. The modified inorganic tubule composition of claim 1, further comprising an agent in and/or on the inorganic tubules, wherein the agent is selected from the group consisting of an ammonium salt, a potassium salt, a cesium salt, a rubidium salt, an iron salt, a silver salt, a copper salt, a transition metal salt, an organometallic compound, a coordination compound, an inorganic compound, an organic compound, a conductive material, a flame-retardant material, an agent for elution of a mineral, a light emitting substance, a colorant, an antioxidant, an emulsifier, an antifungal agent, a pesticide, a fragrance, a dye, an optical brightener, a self-healing polymer, a plasticizer, an antibiotic, an antihelmetic, an antifouling compound, an enzyme, a peptide, bacterial spores, fungi, a hormone, an herbicide and combinations thereof.

47. The modified inorganic tubule composition of claim 8, further comprising an agent in and/or on the inorganic tubules, wherein the agent is selected from the group consisting of an ammonium salt, a potassium salt, a cesium salt, a rubidium salt, an iron salt, a silver salt, a copper salt, a transition metal salt, an organometallic compound, a coordination compound, an inorganic compound, an organic compound, a conductive material, a flame-retardant material, an agent for elution of a mineral, a light emitting substance, a colorant, an antioxidant, an emulsifier, an antifungal agent, a pesticide, a fragrance, a dye, an optical brightener, a self-healing polymer, a plasticizer, an antibiotic, an antihelmetic, an antifouling compound, an enzyme, a peptide, bacterial spores, fungi, a hormone, an herbicide and combinations thereof.

48. A composition for an inorganic tubule-polymer composite material, comprising:
   a) the modified inorganic tubule composition of claim 46; and
   b) a polymer matrix.

49. A composition for an inorganic tubule-polymer composite material, comprising:
   a) the modified inorganic tubule composition of claim 47; and
   b) a polymer matrix.

50. The composition of claim 8, wherein the second block of the functionalized block copolymer includes monomers from the first block that are charged or that can become charged upon a change in pH.

51. The composition of claim 8, wherein the charged monomers or monomers that upon pH change can become charged comprise 2-dimethylaminoethyl methacrylate.

52. The composition of claim 8, wherein each of the first and second blocks comprise a copolymer of styrene and 2-dimethylaminoethyl methacrylate.

53. The composition of claim 8, wherein at least one of the first and second blocks of the block copolymer comprises a copolymer of 4-tert-butylstyrene and 2-dimethylaminoethyl methacrylate.

* * * * *